United States Patent
Terashita et al.

(10) Patent No.: US 8,057,868 B2
(45) Date of Patent: Nov. 15, 2011

(54) COMPOSITION FOR FORMING A LIQUID CRYSTAL ALIGNMENT FILM, AND LIQUID CRYSTAL DISPLAY DEVICE

(75) Inventors: Shinichi Terashita, Osaka (JP); Eiji Satoh, Osaka (JP); Iori Aoyama, Osaka (JP); Shouichi Nakata, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/919,329

(22) PCT Filed: Jan. 7, 2009

(86) PCT No.: PCT/JP2009/050099
§ 371 (c)(1),
(2), (4) Date: Aug. 25, 2010

(87) PCT Pub. No.: WO2009/107406
PCT Pub. Date: Sep. 3, 2009

(65) Prior Publication Data
US 2011/0007254 A1   Jan. 13, 2011

(30) Foreign Application Priority Data
Feb. 28, 2008  (JP) ................. 2008-048307

(51) Int. Cl.
C09K 19/00     (2006.01)
C09K 19/56     (2006.01)
G02F 1/1337    (2006.01)

(52) U.S. Cl. ...... 428/1.2; 428/1.25; 428/1.26; 428/1.27; 349/123; 349/124; 252/299.4

(58) Field of Classification Search ............... 428/1.2, 428/1.225, 1.26, 1.27; 349/123, 124; 437/101
See application file for complete search history.

(56) References Cited

U.S. PATENT DOCUMENTS

| | | | | |
|---|---|---|---|---|
| 5,969,055 A | * | 10/1999 | Nishikawa et al. | 525/419 |
| 2004/0031950 A1 | * | 2/2004 | Shimizu et al. | 252/299.4 |
| 2007/0036915 A1 | | 2/2007 | Kurosaki et al. | |
| 2009/0068343 A1 | * | 3/2009 | Ishida | 427/58 |
| 2009/0068345 A1 | * | 3/2009 | Ishida | 427/68 |
| 2010/0085523 A1 | * | 4/2010 | Terashita et al. | 349/123 |

FOREIGN PATENT DOCUMENTS

| | | |
|---|---|---|
| JP | 07-072483 | 3/1995 |
| JP | 11-095227 | 4/1999 |
| JP | 2001-040209 | 2/2001 |

(Continued)

OTHER PUBLICATIONS

International Search Report for PCT/JP2009/050099, mailed Feb. 3, 2009.

*Primary Examiner* — Shean Wu

(74) *Attorney, Agent, or Firm* — Nixon & Vanderhye, P.C.

(57) ABSTRACT

The present invention provides: a composition for forming a liquid crystal alignment film capable of forming a liquid crystal alignment film excellent in evenness; and a liquid crystal display device. The present invention provides a composition for forming a liquid crystal alignment film, wherein the composition comprises: a material for forming a liquid crystal alignment film; diethylene glycol diethyl ether; diisobutyl ketone; and at least one of γ-butyrolactone and N-methyl-2-pyrrolidone as solvents.

17 Claims, 8 Drawing Sheets

FOREIGN PATENT DOCUMENTS

| | | |
|---|---|---|
| JP | 2005-115231 | 4/2005 |
| JP | 2006-053380 | 2/2006 |
| JP | 2006-281189 | 10/2006 |
| JP | 2006-289355 | 10/2006 |
| JP | 2008-026891 | 2/2008 |
| WO | WO 2004/072719 | 8/2004 |
| WO | WO 2010079637 A1 * | 7/2010 |

* cited by examiner (a)

(b)

COMPOSITION FOR FORMING A LIQUID CRYSTAL ALIGNMENT FILM, AND LIQUID CRYSTAL DISPLAY DEVICE

This application is the U.S. national phase of International Application No. PCT/JP2009/050099 filed 7 Jan. 2009, which designated the U.S. and claims priority to JP Application No. 2008-048307 filed 28 Feb. 2008, the entire contents of each of which are hereby incorporated by reference.

TECHNICAL FIELD

The present invention relates to a composition for forming a liquid crystal alignment film, and a liquid crystal display device. More particularly, the present invention relates to a composition for forming a liquid crystal alignment film and a liquid crystal display device, which are suitably used for liquid crystal display devices with wide viewing angle characteristics, such as planar displays including a PDA, a PC, a WP, amusement equipment, a teaching machine, and a TV device, which are used by many people, and a display board, a display window, a display door, a display wall, etc., each utilizing a shutter effect of liquid crystal.

BACKGROUND ART

A liquid crystal display device is now being widely used attributed to its characteristics such as slim profile, light weight, and low electrical power consumption. The liquid crystal display device includes a pair of substrates and a liquid crystal layer interposed therebetween. Further, the liquid crystal device provides display by controlling an alignment direction of liquid crystal molecules contained in the liquid crystal layer by appropriately applying a voltage to electrodes arranged on liquid crystal layer side-surfaces of the substrates. The liquid crystal display device usually includes a liquid crystal alignment film (hereinafter, simply referred to as "alignment film") for controlling the alignment direction of the liquid crystal molecules, and the alignment film is arranged on the liquid crystal layer side-surface of the substrate.

As a material for such an alignment film constituting the liquid crystal display device, resins such as polyamic acids, polyimides, polyamides, and polyesters are conventionally used. Among them, polyimides have been much used for liquid crystal display devices attributed to its excellent physical properties such as heat resistance, affinity with liquid crystals, and mechanical strength compared with other organic resins.

Methods for printing an alignment film include spin coat method, roll coat method, flexographic printing, and inkjet printing. Flexographic printing has been suitably used for pattern printing. In this method, ink is put on an APR plate uniformly and is transferred to a substrate. This method is less likely to cause film thickness irregularity. However, from the standpoint of achieving high throughput, inkjet printing is suitable for printing the film on a large substrate of the sixth or higher generation.

The technical art about formation of an alignment film by inkjet printing is disclosed against this background. More specifically, a composition for forming a liquid crystal alignment film is disclosed which comprises: a solvent containing 10% by weight or more of an amide compound; and a material for forming a liquid crystal alignment film dissolved in the solvent (for example, refer to Patent Document 1). Moreover, a vacuum freeze-drying method is disclosed which comprises the steps of applying a polyimide alignment film on a substrate by inkjet application, and cooling the substrate to freeze the medium, instead of heating the substrate to dry the medium, so that the medium sublimes in vacuo (for example, refer to Patent Document 2). Furthermore, a thin-film forming apparatus is disclosed which comprises: a vacuum chamber as a room for forming a film by spraying application, which includes at least a substrate transfer table, an inkjet head, and a head supporting member therein; and decompressing means for decompressing the vacuum chamber in order to perform film formation by spraying application in vacuo (for example, refer to Patent Document 3).

Moreover, a protective and alignment film for liquid crystals is disclosed which has excellent physical properties including heat resistance, chemical resistance, adhesion with a glass substrate and color filter, transparency, and printability, and is excellent in alignment property and planarizing performance. Specifically, a protective and alignment film for liquid crystals is disclosed which comprises a polyimide film formed by heating to dry a liquid film comprising a resin composition containing a polyamide acid that has the weight average molecular weight of 1000 to 20000, the liquid film being formed on the surface of a liquid crystal holding substrate by a printing method, and the surface having an electrode formed thereon (for example, refer to Patent Document 4).

Furthermore, a substrate with an alignment film for liquid crystal elements is disclosed as a technical art related to a photo-alignment film. Specifically, the substrate with an alignment film for liquid crystal elements is disclosed which comprises a polyimide coating formed on the substrate, the polyimide coating being prepared by polymerizing a layer comprising a composition for forming an alignment film which contains polyimide or a polyimide precursor. The polymerization includes sequential polymerization in a direction corresponding to the direction of a polarization axis of the irradiated light and polymerization by linear polarized light (for example, refer to Patent Documents 5).

In addition, a composition for photo-aligned liquid crystal alignment film is disclosed which comprises a recurring unit represented by a general formula (I):

[Chem. 1]

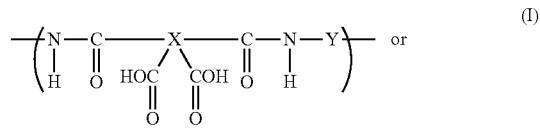

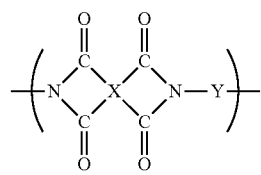

(in the formula (I), X representing a tetravalent organic group and Y representing a divalent organic group). Further, the composition comprises polyimide or a precursor thereof which has a divalent organic group represented by a general formula (II):

[Chem. 2]

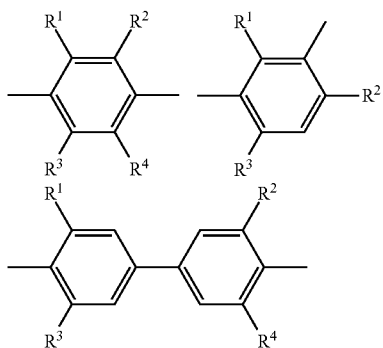

(in the formula (II), $R^2$, $R^3$, and $R^4$ being each independently selected from —H, —$CH_3$, and —$CH_2CH_3$) as at least a part of Y (for example, refer to Patent Document 6).
[Patent Document 1]
Japanese Kokai Publication No. 2006-53380
[Patent Document 2]
Japanese Kokai Publication No. 2006-281189
[Patent Document 3]
Japanese Kokai Publication No. 2006-289355
[Patent Document 4]
Japanese Kokai Publication No. Hei-11-95227
[Patent Document 5]
Japanese Kokai Publication No. Hei-07-72483
[Patent Document 6]
Japanese Kokai Publication No. 2001-40209

DISCLOSURE OF INVENTION

However, since a conventional inkjet printer used for inkjet printing has a number of heads arranged vertically to the print direction and the discharge amounts of respective heads are different, there has been a problem that drying of a medium (solvent) prior to leveling of ink may cause the band-shaped irregularities in film thickness, resulting in the display unevenness. Therefore, the coating properties of ink and the flatness of an alignment film need to be still improved by a choice of a solvent used for inkjet printing and the proportion of the solvent. Especially, poor coating properties in inkjet printing are found in materials for forming a liquid crystal alignment film which contain fluorine atoms in the portion for vertically aligning liquid crystal molecules. It is to be noted that, in the case where repelling of ink or film thickness irregularity occurs due to the poor coating properties of the ink, display quality of a display panel is significantly lowered when the alignment film is formed into a panel.

Moreover, the flexographic printing has been widely known as a printing method of a vertical alignment film. Therefore, improvement in the cleaning process of a substrate and material development for ink having low surface tension and high boiling point have been made in order to enhance the coating properties of the ink in printing. Especially, the ink shows poor coating properties for the substrate in forming a photo-alignment film having a photofunctional group in a side chain that has fluorine or an alkyl group at its end or forming a vertical alignment film having a side chain including a functional group (vertically alignment functional group) showing vertical alignment properties. This results in repelling or shrinkage of liquid and uniform application of ink becomes hard. In addition, the inkjet printing has a peculiar problem that the optimum range of physical properties of ink is narrow (for example, the optimum range of surface tension: 28 to 32 mN/m, the optimum range of viscosity: 5 to 10 mPa·s, the optimum range of the boiling point of a solvent: about 180 to 200° C.) Therefore, since a large number of solvents and their combinations are available, it is quite difficult to optimize the medium and the component ratio of ink so that the ink is capable of improving the liquid spreading, preventing the liquid shrinkage, and enhancing the leveling performance.

Here, the mechanism of the liquid spreading and liquid shrinkage of the ink is explained with reference to drawings. FIG. 1 is a schematic cross-sectional view for explaining the mechanism of the liquid spreading of ink. FIG. 2 are conceptual views each illustrating a state of polymer for forming a liquid crystal alignment film in the solvent. FIG. 2(a) illustrates the state in a low-concentration case and FIG. 2(b) illustrates the state in a high-concentration case. Furthermore, FIGS. 3(a) to 3(c) are schematic cross-sectional views each illustrating the action of an ink drop having reached on a substrate.

First, the mechanism of the liquid spreading of ink is explained. Liquid spreading (spreading wetting) is explained as a spreading coefficient S which is a difference of energy per unit area of the ink before and after its wet spreading, namely, a measure of spreading wettability. As shown in FIG. 1, the spreading coefficient S is represented by the following formula:

$$S=\gamma s-\gamma w-\gamma ws,$$

wherein γs represents the surface tension of a solid matrix (substrate) 31, γw represents the surface tension of a liquid (ink) 32, and γws represents the interfacial tension between the solid matrix 31 and the liquid 32.

Accordingly, larger γs, smaller γw, and smaller yws enhance the spreading wettability of a liquid. Moreover, since a surface active agent in the liquid 32 makes γw and γws smaller, it has been found out that addition of a surface active agent to the liquid 32 promotes the liquid spreading (spreading wetting).

The possible actions to improve the liquid spreading of ink are mentioned below. One action is increasing the surface tension ys of the substrate 31, namely, cleaning the surface of the substrate 31 so that the substrate 31 has a large surface free energy (the substrate 31 is hydrophilic). Another action is making the surface tension γw of the ink 32 smaller. Still another action is making the interfacial tension yws between the substrate 31 and the ink 32 smaller. These actions can improve the liquid spreading of ink.

Next, the liquid shrinkage mechanism of ink is explained.

In low concentration ink, an amphiphile (solid component of polymer for a liquid crystal alignment film) 33 is presumably dissolved in a state where a hydrophobic part 34 gathers to the air (hydrophobicity) side and a hydrophilic part 35 exists in a medium (hydrophilicity) as shown in FIG. 2(a). When PIJ ink (ink for inkjet printing containing polyimide or a polyamic acid) is used as an alignment agent (composition for forming a liquid crystal alignment film), liquid back of the ink tends to occur. The reason for this is presumably that the concentration of the PIJ ink is extremely high compared to that of the normal surface active agent (several tens to hundreds of ppm) and, as shown in FIG. 2(b), the amphiphile component of polymer in a liquid crystal alignment film) 33 which is also a surface active agent forms micells 36 that are to be aggregated. This presumably causes the liquid shrinkage in the pre-baking of the alignment agent.

Consequently, the ink (liquid) 32 having reached on the substrate (solid matrix) 31 as shown in FIG. 3(a) first spreads as shown in FIG. 3(b), and then shrinks as shown in FIG. 3(c) after pre-baking.

Therefore, with respect especially to the material for forming a liquid crystal alignment film (polymer) containing a fluorine atom, a single solvent does not exists which has excellent solubility, is excellent in the liquid spreading, and is capable of preventing the liquid shrinkage. Consequently, it is quite difficult to prepare ink containing such a material for forming a liquid crystal alignment film and being excellent in coating properties.

The present invention is made in view of the above-mentioned present condition, and an object thereof is to provide: a composition for forming a liquid crystal alignment film, which is excellent in coating properties even when used for inkjet printing and is capable of forming a liquid crystal alignment film excellent in flatness; and a liquid crystal display device.

The present inventors have made various investigations on the composition for forming a liquid crystal alignment film, which is excellent in coating properties even when used for inkjet printing and is capable of forming a liquid crystal alignment film excellent in flatness; and the liquid crystal display device. Then, the present inventors have paid their attention to a medium (solvent) for dissolving an alignment film material (material for forming a liquid crystal alignment film). Consequently, the present inventors have found the following. In order to obtain ink (composition for forming a liquid crystal alignment film) excellent in coating properties even when used for inkjet printing, a medium having a low surface tension is desirable from the standpoint of enhancing the liquid spreading. Further, the medium desirably has the composition less likely to formmicells and is preferably a single solvent or solvent species having the similar boiling points from the standpoint of improving the liquid shrinkage. Here, it is known that a highly-soluble solvent is called a good solvent and has poor liquid spreading and liquid shrinkage properties, and a poorly-soluble solvent is called a poor solvent and has excellent liquid spreading and liquid shrinkage properties.

Then, as a result of further investigation, the present inventors have arrived at involving both a good solvent and a poor solvent in the composition for forming a liquid crystal alignment film so as to obtain the composition exerting excellent coating properties (liquid spreading and liquid shrinkage properties) even when applied to the substrate for liquid crystal display panel such as a TFT substrate and a CF substrate. More specifically, the composition for forming a liquid crystal alignment film is made to contain diethylene glycol diethyl ether, diisobutyl ketone, and at least one of γ-butyrolactone and N-methyl-2-pyrrolidone. Consequently, the present inventors have arrived at solving the above-mentioned problem, thereby completing the present invention.

Namely, the present invention provides a composition for forming a liquid crystal alignment film, wherein the composition comprises: a material for forming a liquid crystal alignment film; diethylene glycol diethyl ether; diisobutyl ketone; and at least one of γ-butyrolactone and N-methyl-2-pyrrolidone. The composition exerts excellent coating properties (liquid spreading and liquid shrinkage properties) even when used for inkjet printing, so that a liquid crystal alignment film excellent in flatness can be formed.

The configuration of the composition for forming a liquid crystal alignment film of the present invention is not especially limited as long as it essentially includes such components. The composition may or may not include other components. However, the composition for forming a liquid crystal alignment film preferably includes N-methyl-2-pyrrolidone.

Preferable embodiments of the composition for forming a liquid crystal alignment film of the present invention are mentioned in more detail below. The following embodiments may be employed in combination.

The material for forming a liquid crystal alignment film is not especially limited as long as it is a material for forming a liquid crystal alignment film usable for forming a conventional liquid crystal alignment film. A material highly soluble in at least one of γ-butyrolactone and N-methyl-2-pyrrolidone are suitably used. That is, the composition for forming a liquid crystal alignment film preferably comprises at least one of the γ-butyrolactone and the N-methyl-2-pyrrolidone as a good solvent for the material for forming a liquid crystal alignment film. In other words, the γ-butyrolactone and the N-methyl-2-pyrrolidone are preferably good solvents for the material for forming a liquid crystal alignment film. Here, the good solvent dissolves the solid component substantially entirely (more preferably. completely) at 24° C., when 2% to 10% by weight of the solid component (material for forming a liquid crystal alignment film) is to be dissolved. That is, the γ-butyrolactone and the N-methyl-2-pyrrolidone preferably dissolve 2% to 10% by weight of the material for forming a liquid crystal alignment film substantially entirely (more preferably, completely) at 24° C.

Moreover, a material poorly soluble to diethylene glycol diethyl ether and to diisobutyl ketone is suitable as the material for forming a liquid crystal alignment film. That is, the composition for forming a liquid crystal alignment film preferably comprises the diethylene glycol diethyl ether and the diisobutyl ketone as poor solvents for the material for forming a liquid crystal alignment film. In other words, the diethylene glycol diethyl ether and the diisobutyl ketone are preferably poor solvents for the material for forming liquid crystal alignment film. Here, the poor solvent does not dissolve the solid component practically at all (more preferably, completely at all) at 24° C., when 2% to 10% by weight of the solid component (material for forming a liquid crystal alignment film) is to be dissolved. That is, the diethylene glycol diethyl ether and the diisobutyl ketone preferably do not dissolve 2% to 10% by weight of the material for forming a liquid crystal alignment film practically at all (more preferably, completely at all) at 24° C.

Moreover, a material containing a copolymer formed by polymerizing two diamines with an acid anhydride is suitably used as the material for forming a liquid crystal alignment film.

Furthermore, two diamines in the material for forming a liquid crystal alignment film suitably comprise: a first diamine having a side chain including a photofunctional group and fluorine; and a second diamine having a side chain including a vertical alignment functional group. Thus, according to the composition for forming a liquid crystal alignment film of the present invention, it is possible to form a liquid crystal alignment film having a uniform thickness while effectively preventing the repelling or shrinkage of liquid, even when the material for forming a liquid crystal alignment film contains a fluorine atom.

The material for forming a liquid crystal alignment film is preferably a polyamic acid or a polyimide which comprises: an acid anhydride unit derived from an acid anhydride; a photo-alignment diamine unit derived from a diamine having a side chain including a photofunctional group and fluorine; and a vertical alignment diamine unit derived from a diamine having a side chain including a vertical alignment functional group, and has the acid anhydride unit and any of the photo-alignment diamine unit and the vertical alignment diamine unit alternately arranged therein.

Thus, the material for forming a liquid crystal alignment film preferably comprises a copolymer. More specifically, the copolymer in the material for forming a liquid crystal alignment film preferably has at least one main chain structure selected from the group consisting of a polyamic acid, a polyimide, polyimide, and a polysiloxane. The copolymer in the material for forming a liquid crystal alignment film is preferably formed from diamine. Further, the copolymer in the material for forming a liquid crystal alignment film is preferably a copolymer of monomer components including diamine and at least one of an acid anhydride and a dicarboxylic acid.

The copolymer in the material for forming a liquid crystal alignment film may be a polyimide-imide. However, from the standpoint of improving heat resistance and electrical characteristics of a liquid crystal alignment film, the copolymer in the material for forming a liquid crystal alignment film preferably has at least one main chain structure of a polyamic acid and a polyimide. That is, the copolymer in the material for forming a liquid crystal alignment film is preferably a copolymer of monomer components including diamine and an acid anhydride.

Here, the ratio of two diamines in the material for forming a liquid crystal alignment film is not especially limited, and may be set as appropriate. Specifically, (vertical alignment diamine unit)/(photo-alignment diamine unit) may be arbitrarily set within the range of 0 to 1.

Moreover, distribution of the constitutional units of the copolymer in the material for forming a liquid crystal alignment film is not especially limited, and it may be any of alternating copolymer, block copolymer, random copolymer, and graft copolymer.

Furthermore, the molecular weight of the copolymer in the material for forming a liquid crystal alignment film is not especially limited. However, copolymer preferably has the molecular weight to such an extent that is appropriate to be used in a liquid crystal alignment film in the same manner as the copolymer contained in the conventional material for forming a liquid crystal alignment film.

In the present description, the photofunctional group is not especially limited as long as it is a functional group capable of exhibiting the property of controlling alignment of liquid crystal molecules by photoirradiation. The group preferably performs at least one reaction of cross-linkage (including dimerization), decomposition, isomerization, and photo realignment, more preferably, at least one reaction of cross-linkage (including dimerization), isomerization, and photo realignment, when irradiated by light, preferably by DV light, more preferably by polarized UV light.

In the present description, a vertical alignment functional group is not especially limited as long as it is a functional group capable of exhibiting a property of vertically aligning liquid crystal molecules, but preferably a functional group capable of exhibiting such a property by rubbing or without any treatment, more preferably without any treatment, i.e., without the alignment treatment.

The second diamine (for example, diamine having a side chain including a vertical alignment functional group) of the two diamines is not especially limited as long as it is a diamine having a side chain including an alignment functional group (functional group exhibits the property of controlling alignment of the liquid crystal molecules regardless of the photo irradiation), and may be a diamine having a side chain including a horizontal alignment functional group.

In addition, the horizontal alignment functional group is not especially limited as long as it is a functional group capable of exhibiting a property of horizontally aligning liquid crystal molecules, but preferably a functional group capable of exhibiting such a property by rubbing or without any treatment.

Moreover, as the material for forming a liquid crystal alignment film, at least one polymer selected from the group consisting of a polyamic acid and a polyimide other than the above-mentioned photo alignment materials may be used. Thus, the copolymer in the material for forming a liquid crystal alignment film may be a copolymer of monomer components including a diamine having a side chain including an alignment functional group (functional group exhibits the property of controlling alignment of the liquid crystal molecules regardless of the photoirradiation) and an acid anhydride.

[Tetracarboxylic Dianhydride]

As an acid anhydride used for synthesis of the polyamic acid, a tetracarboxylic dianhydride is suitably used. Examples of the tetracarboxylic dianhydride include butanetetracarboxylic dianhydride, 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutanetetracarboxylic dianhydride, 1,2,3,4-cyclopentane tetracarboxylic dianhydride, 1,2,4,5-cyclohexane tetracarboxylic dianhydride, 3,3',4,4'-dicyclohexyltetracarboxylic dianhydride, 2,3,5-tricarboxycyclopentylacetic dianhydride, 2,3,4,5-tetrahydrofuran tetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5(tetrahydro-2,5-dioxo 3-furayl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3-dione, 1,3,3a,4,5,9b-hexahydro-7-ethyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, bicyclo[2,2,2]-oct-7-ene-2,3,5,6-tetracarboxylic dianhydride, bicyclo[3,3,0]octane-2,4,6,8-tetracarboxylic dianhydride, 3-oxabicyclo[3.2.1]octane-2,4-dione-6-spiro-3'-(tetrahydrofuran-2',5'-dione), 5-(2,5-dioxotetrahydro-3-furanyl)-3-methyl-3-cyclohexene-1,2-dicarboxylic anhydride, 3,5,6-tricarboxy-2-carboxymethyl norbornane-2:3,5:6-dianhydride, 4,9-dioxatricyclo[5.3.1.0$^{2,6}$]undecane-3,5,8,10-tetraon, and aliphatic or alicyclic tetracarboxylic dianhydride, such as a compound represented by each of the following formulae (III) and (IV);

[Chem. 3]

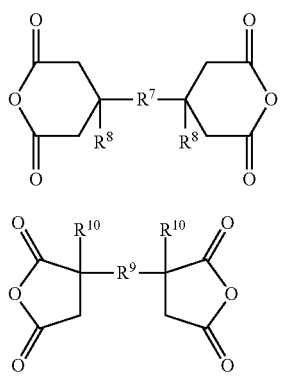

(in the formulae (III) and (IV), $R^7$ and $R^9$ each representing a divalent organic group having an aromatic ring, a plurality of $R^8$ and $R^{10}$ each representing a hydrogen atom or an alkyl group and respectively being the same or different) Pyromellitic dianhydride, 3,3',4,4'-benzophenone tetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic 4,4'-bis(3,4-dicarboxyphenoxy) diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidene diphtalic dianhydride, 3,3',4,4'-biphenyltetracarboxylic dianhydride, 2,2',3,3'-biphenyltetracarboxylic dianhydride, bis (phthalic acid) phenylphosphine oxide dianhydride, p-phenylene-bis (triphenylphthalic acid) dianhydride, m-phenylene-bis (triphenylphthalic acid) dianhydride, his (triphenylphthalic acid)-4,4'-diphenyl ether dianhydride, his (triphenylphthalic acid)-4,4'-diphenylmethane dianhydride, ethylene glycol-bis (anhydrotrimellitate) propylene glycol-bis (anhydrotrimellitate) 1,4-butanediol-bis (anhydrotrimellitate), 1,6-hexanediol-bis (anhydrotrimellitate) 1,8-octanediol-bis (anhydrotrimellitate) 2,2-bis(4-hydroxyphenyl) propane-bis (anhydrotrimellitate) and aromatic tetracarboxylic dianhydride, such as compounds represented by the following formulae (27) to (30). Each of these may be used alone, or two or more of these may be used in combination.

It is to be noted that a benzene ring of the aromatic acid dianhydride may be substituted by one or more alkyl groups (preferably methyl groups) each having 1 to 4 carbon atoms

[Chem. 4]

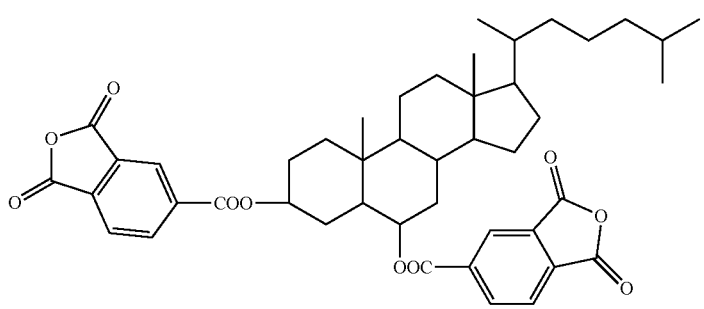

(27)

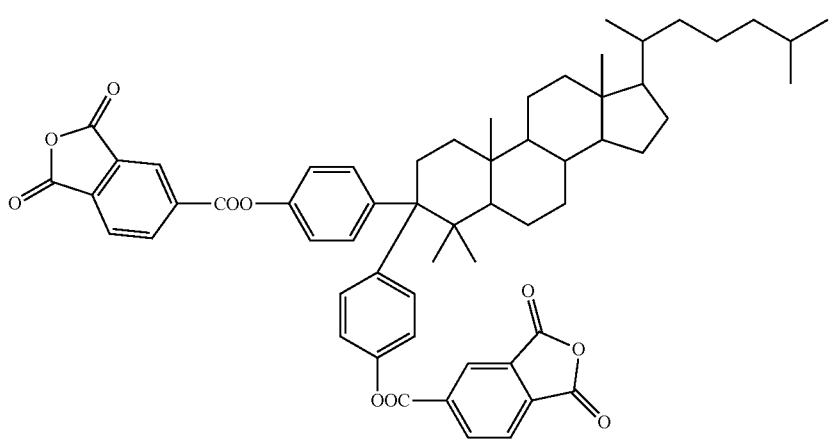

(28)

-continued

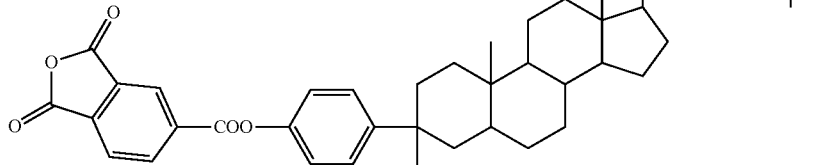
(29)

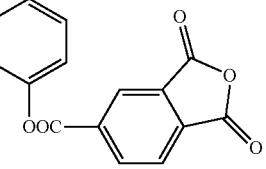

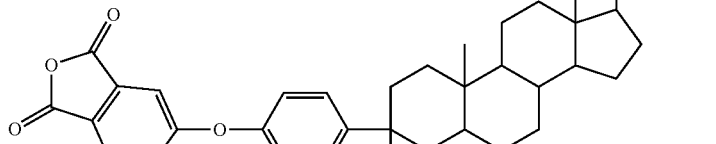
(30)

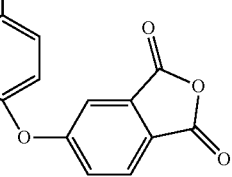

Among these, the following materials are preferably used from a standpoint of achieving good liquid crystal alignment: butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentane tetracarboxylic dianhydride, 2,3,5-tricarboxycyclopentylacetic dianhydride, 1,3,3a,4,5,9b-hexahydro-5-(tetrahydro-2,5-dioxo-3-furanyl) -naphtho[1,2-c]furan-1,3-dione, 1,3,3a,4,5, 9b-hexahydro-8-methyl-5-(tetrahydro-2,5-dioxo-3-furanyl)-naphtho[1,2-c]furan-1, 3-dione, 1,3,3a,4,5,9b-hexahydro-5, 8-dimethyl-5-(tetrahydro-2,5-diox o-3-furanyl)-naphtho[1, 2-c]furan-1,3-dione, bicyclo[2,2,2]-oct-7-ene-2,3,5,6-tetracarboxylic dianhydride, bicyclo[3,3,0]octane-2,4,6,8-tetracarboxylic dianhydride, 3-oxabicyclo[3.2.1]octane-2,4-dione-6-spiro-3'-(tetrahydrof uran-2',5'-dione), 5-(2,5-dioxotetrahydro-3-furanyl)-3-methyl-3-cyclohexene-1, 2-dicarboxylic anhydride, 3,5,6-tricarboxy-2-carboxymethyl norbornane 2:3,5:6-dianhydride, 4,9-dioxatricyclo[5.3.1.0$^{2,}$ $^6$]undecane-3,5,8,10-tetraon, pyromellitic dianhydride, 3,3', 4,4'-benzophenone tetracarboxylic dianhydride, 3,3',4,4'-biphenylsulfonetetracarboxylic dianhydride, 2,2',3,3'-biphenyltetracarboxylic dianhydride, 1,4,5,8-naphthalenetetracarboxylic dianhydride, compounds represented by the following formulae (31) to (33) among the compounds represented by the formula (III), and a compound represented by the formula (34) among the compounds represented by the formula (IV).

Particularly preferable materials include 1,2,3,4-cyclobutanetetracarboxylic dianhydride, 2,3,5-tricarboxycyclopentylacetic dianhydride, 1,3,3a,4,5,9b-hexahydro-5-(tetrahydro-2,5-dioxo-3-furanyl) -naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, bicyclo[3,3,0]octane-2,4,6,8-tetracarboxylic dianhydride, 3-oxabicyclo [3.2.1]octane-2,4-dione-6-spiro-3'-(tetrahydrof uran-2',5'-dione), 5-(2,5-dioxotetrahydro-3-furanyl)-3-methyl-3-cyclohexene-1, 2-dicarboxylic anhydride, 3,5,6-tricarboxy-2-carboxymethyl norbornane 2:3,5:6-dianhydride, 4,9-dioxatricyclo[5.3.1.0$^{2,6}$]undecane-3,5,8,10-tetraon, pyromellitic dianhydride, and the compound represented by the following formula (31).

[Chem. 5]

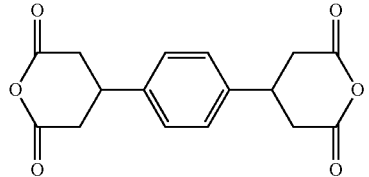
(31)

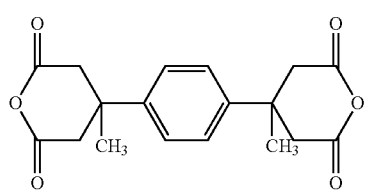
(32)

-continued (33)

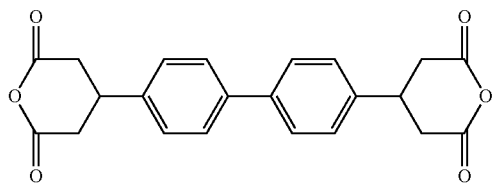

(34)

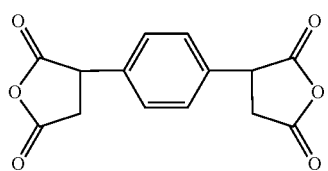

[Diamine]

Examples of diamine used for synthesis of the polyamic acid includes: aromatic diamines; aliphatic or alicyclic diamines; diamines having two primary amino groups and a nitrogen atom. other than the primary amino groups in its molecule; mono-substituted phenylenediamines; and diaminoorganosiloxanes.

The aromatic diamines include p-phenylenediamine, m-phenylenediamine, 4,4'-diaminodiphenylmethane, 4,4'-diaminodiphenylethane, 4,4'-diaminodiphenyl sulfide, 4,4'-diaminodiphenyl sulfone, 3,3'-dimethyl-4,4'-diaminobiphenyl, 4,4'-diaminobenzanilide, 4,4'-diaminodiphenyl ether, 1,5-diaminonaphthalene, 2,2'-dimethyl-4,4'-diaminobiphenyl, 5-amino-1-(4'-aminophenyl)-1,3,3-trimethylindan, 6-amino-1-(4'-aminophenyl)-1,3,3-trimethylindan, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy) phenyl] hexafluoropropane, 2, 2-bis(4-aminophenyl) hexafluoropropane, bis[4-(4-aminophenoxy)phenyl]sulfone, 1,4-bis(4-aminophenoxy)benzene, 4,4'-bis(4-aminophenoxy)biphenyi, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-dimethyl-2,7-diaminofluorene, 9,9-bis(4-aminophenyl)fluorene, bis(4-amino-2-chlorophenyl)methane, 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(p-phenylenediisopropylidene)bisaniline, 4,4'-(m-phenylenediisopropylidene)bisaniline, 2,2'-bis[4-(4-amino-2-trifluoromethylphenoxy) phenyl] hexafluoropropane, 4,4'-diamino-3,3'-bis(trifluoromethyl) biphenyl, 4,4'-diamino-2,2'-bis(trifluoromethyl)biphenyl, and 4,4'-bis[(4-amino-2-trifluoromethyl)phenoxy]-octafluorobiph enyl.

The aliphatic or alicyclic diamines include 1,1-metaxylylenediamine, 1,3-propanediamine, tetramethylenediamine, pentamethylenediamine, hexamethylenediamine, heptamethylenediamine, octamethylenediamine, nonamethylenediamine, 1,4-diaminocyclohexane, isophoronediamine, tetrahydrodicyclopentadienylenediamine, hexahydro-4,7-methanoindanylenedimethylenediamine, tricycle [6.2.1.0$^{2,7}$]-undecylenedimethylenediamine, 4,4'-methylenebis(cyclohexylamine), 1,3-bis(aminomethyl)cyclohexane, and 1,4-bis(aminomethyl)cyclohexane.

The diamines having two primary aminio groups and a nitrogen atom other than the primary amino groups in its molecule include 2,3-diaminopyridine, 2,6-diaminopyridine, 3,4-diaminopyridine, 2,4-diaminopyrimidine, 5,6-diamino-2,3-dicyanopyrazine, 5,6-diamino-2,4-dihydroxypyrimidine, 2,4-diamino-6-dimethylamino-1,3,5-triazine, 1, 4-bis(3-aminopropyl) piperazine, 2,4-diamino-6-isopropoxy-1,3,5-triazine, 2,4-diamino-6-methoxy-1,3,5-triazine, 2, 4-diamino--6--phenyl-1, 3, 5-triazine, 2,4-diamino-6-methyl-s-triazine, 2,4-diamino-1,3,5-triazine, 4,6-diamino-2-vinyl-s-triazine, 2,4-diamino-5-phenylthiazole, 2, 6-diaminopurine, 5,6-diamino-1,3-dimethyluracil, 3,5-diamino-1,2,4-triazole, 3,8-diamino-6-phenylphenanthridine, 1,4-diaminopiperazine, 3,6-diaminoacridine, N,N'-bis(4-aminophenyl)phenylamine, 3,6-diaminocarbazole, N-methyl-3,6-diaminocarbazole, N-ethyl-3,6-diaminocarbazole, N-phenyl-3,6-diaminocarbazole, N,N' -bis(4-aminophenyl)-benzidine, N,N'-bis(4-aminophenyl)-N,N-dimethyl-benzidine, compounds represented by each of the following formulae (V) to (VI).

[Chem. 6]

(V)

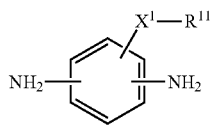

(in the formula (V), $R^{11}$ representing a monovalent organic group which has a ring structure including a nitrogen atom selected from pyridine, pyrimidine, triazine, piperidine, and piperazine, and $X^1$ representing a divalent organic group)

[Chem. 7]

(VI)

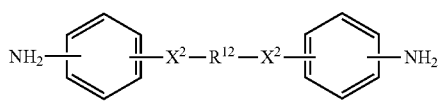

(in the formula (VI), $R^{12}$ representing a divalent organic group which has a ring structure including a nitrogen atom selected from pyridine, pyrimidine, triazine, piperidine, and piperazine, and a plurality of $X^2$ representing divalent organic groups and respectively being the same or different)

The mono-substituted phenylenediamines is represented by the following formula (VII):

[Chem. 8]

(VII)

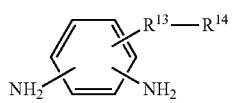

in the formula (VII), $R^{13}$ representing a divalent linking group selected from —O—, —COO—, —OCO—, —NHCO—, —CONH—, and —CO—, and $R^{14}$ representing an alkyl group having 6 to 30 carbon atoms or a monovalent organic group which has a group selected from a steroid skeleton, a trifluoromethyl group, and a fluoro group. Here, the steroid skeleton refers to a skeleton comprising a cyclopentano-perhydrophenanthrene nucleus, or a skeleton in which one or more carbon-carbon bonds are double-bonded.)

The diaminoorganosiloxanes are each represented by the following formula (VIII):

[Chem. 9]

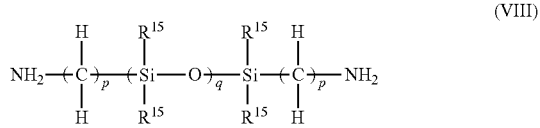
(VIII)

(in the formula (VIII), a plurality of $R^{15}$ representing hydrocarbon groups each having 1 to 12 carbon atoms and respectively being the same or different, p representing an integer within the range of 1 to 3, and q being an integer within the range of 1 to 20.)

Examples of diamines further include compounds represented by the following formulae (35) to (39).

Each of these diamines may be used alone, or two or more of these may be used in combination.

Benzene rings of the aromatic diamines maybe substituted by one or more alkyl groups (preferably methyl groups) each having 1 to 4 carbon atoms.

[Chem. 10]

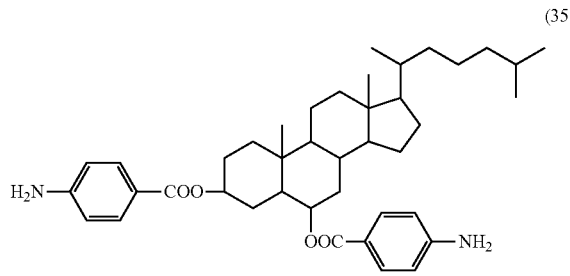
(35)

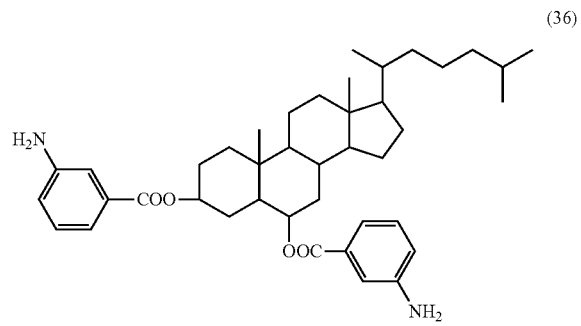
(36)

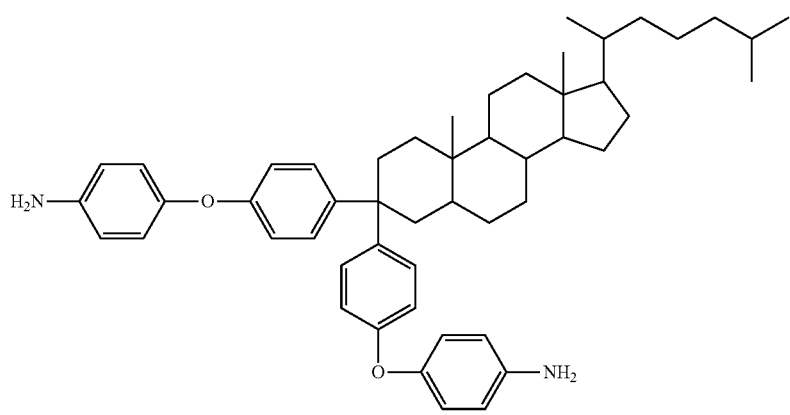
(37)

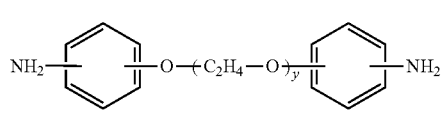
(38)

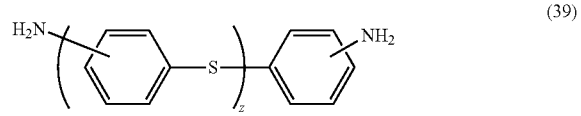
(39)

[Chem. 11]

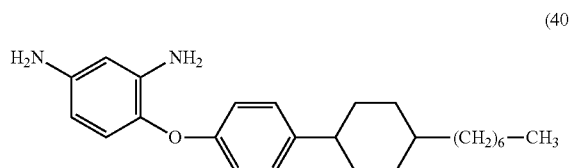
(40)

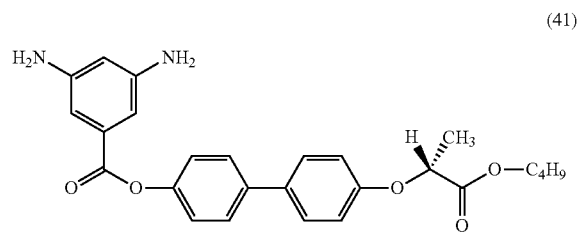
(41)

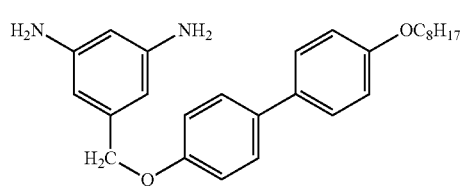
(42)

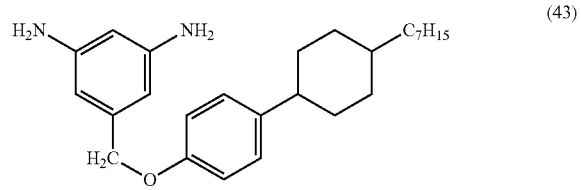
(43)

-continued
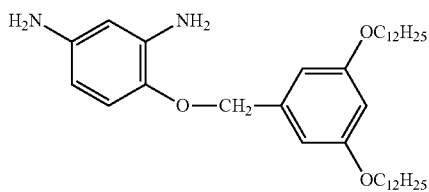
(44)
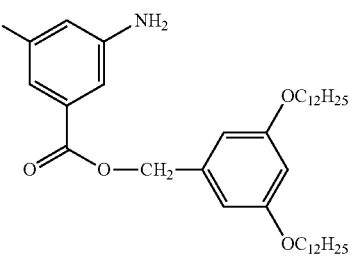
(45)
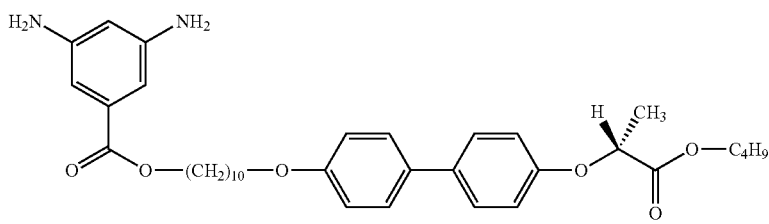
(46)
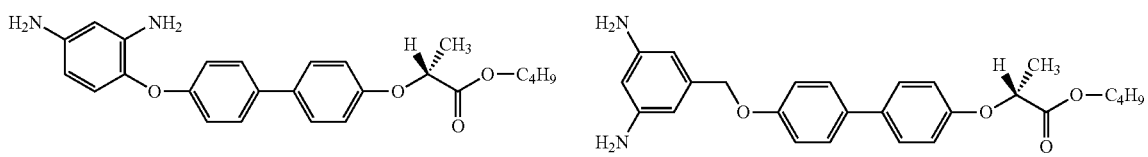
(47)
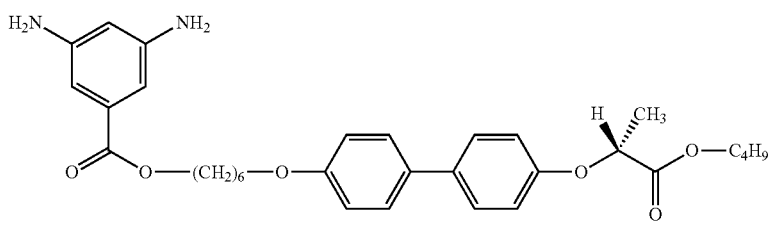
(48)
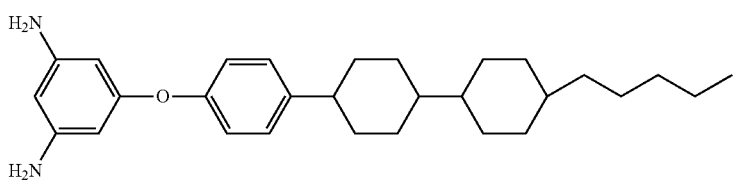
(49)
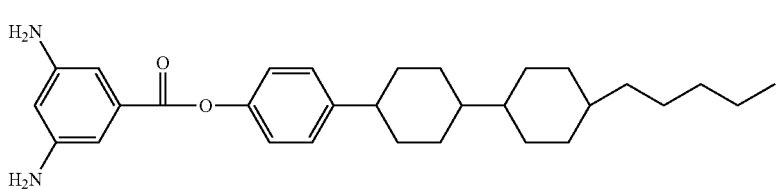
(50)
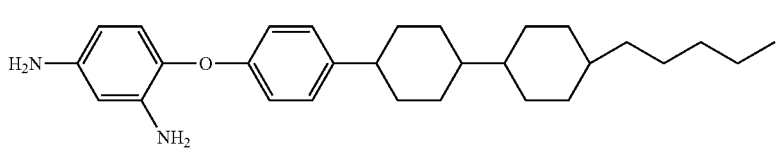
(51)
[Chem. 12]
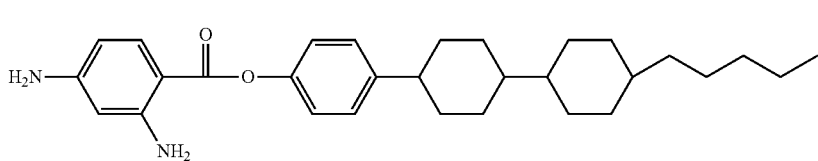
(52)
(53)

-continued
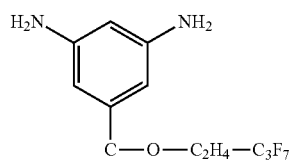
(54)
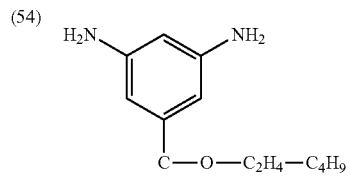
(55)
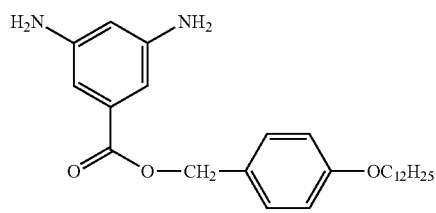
(56)
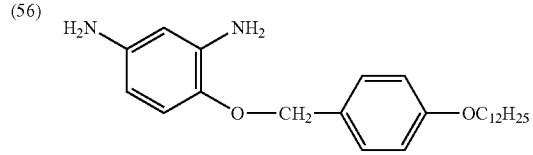
(57)
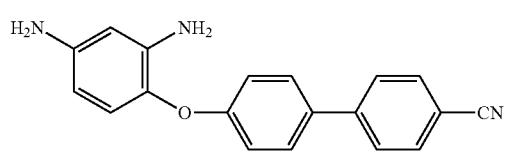
(58)
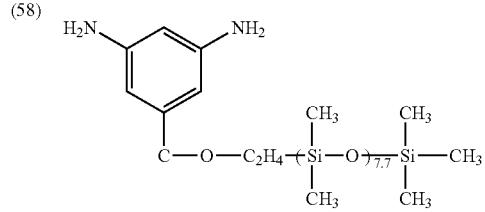
(59)
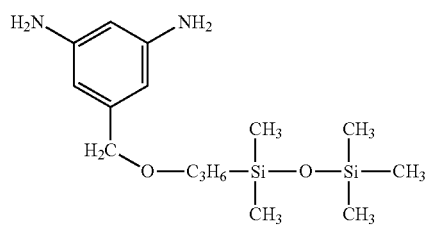
(60)
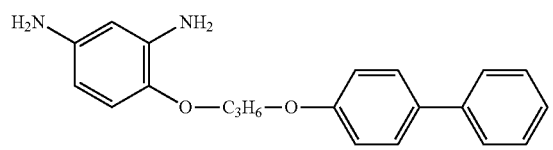
(61)
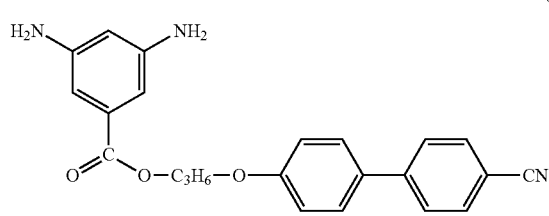
(62)
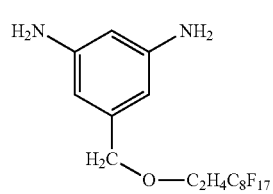
(63)
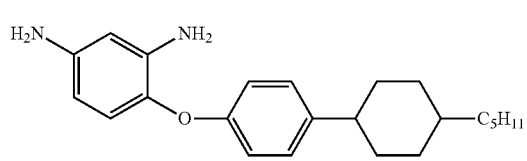
(64)
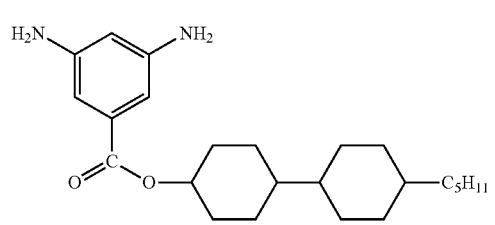
(65)

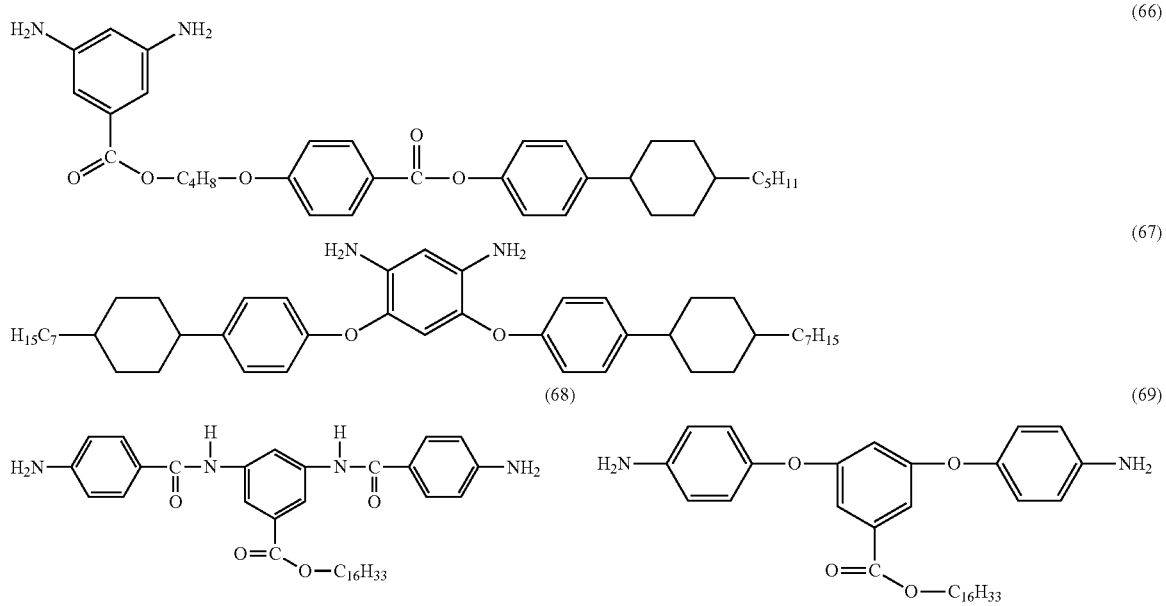

(in the formula (38), y representing an integer within the range of 2 to 12, and in the formula (39), z representing an integer within the range of 1 to 5)

Among these, preferable diamines p-phenylenediamine; 4,4'-diaminodiphenylmethane; 4,4'-diamino diphenyl sulfide; 4,4'-diaminobenzanilide; 1,5-diaminonaphthalene; 2,2'-dimethyl-4,4'-diaminobiphenyl; 4,4'-diamino-2,2'-bis(trifluoromethyl)biphenyl; 2,7-diaminofluorene; 4,4'-diaminodiphenyl ether; 2,2-bis[4-(4-aminophenoxy)phenyl]propane; 9,9-bis(4-aminophenyl)fluorene; 2,2-bis[4-(4-aminophenoxy) phenyl] hexafluoropropane; 2,2-bis(4-aminophenyl)hexafluoropropane; 4,4'-(p-phenylenediisopropylidene)bisaniline; 4,4'-(m-phenylenediisopropylidene)bisaniline; 1,4-bis(4-aminophenoxy)benzene; 4,4'-bis(4-aminophenoxy)biphenyl; 1,4-diaminocyclohexane;

4,4'-methylenebis(cyclohexylamine); 1,3-bis(aminomethyl)cyclohexane; compounds represented by the formulae (35) to (69); 2,6-diaminopyridine; 3,4-diaminopyridine; 2,4-diaminopyrimidine; 3,6-diaminoacridine; 3,6-diaminocarbazole;

N-methyl-3,6-diaminocarbazole; N-ethyl-3,6-diaminocarbazole; N-phenyl-3,6-diaminocarbazole; N,N'-bis(4-aminophenyl)-benzidine; N,N'-bis(4-aminophenyl)-N,N'-dimethylbenzidine; compounds represented by the following formula (70) among the compounds represented by the formula (V); compounds represented by the following formula (71) among the compounds represented by the formula (VI); dodecanoxy-2,4-diaminobenzene, Pentadecanocy-2,4-diaminobenzene, hexadecanoxy-2,4-diaminobenzene, octadecanoxy-2,4-diaminobenzene, dodecanxy-2,5-diaminobenzene, pentadecanoxy-2,5-diaminobenzene, hexadecanoxy-2,5-diaminobenzene, and octadecanoxy-2,5-diaminobenzene among the compounds represented by the formula (VII); compounds represented by the following formulae (72) to (83); and 1,3-bis(3-aminopropyl)-tetramethyldisiloxane among the compounds represented by the formula (VIII).

[Chem. 14]

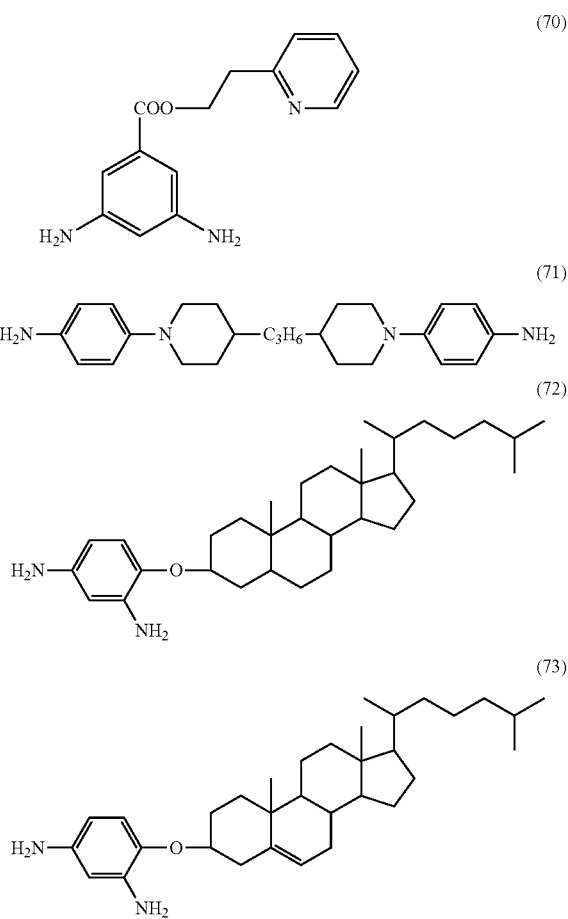

[Chem. 16]

(74)
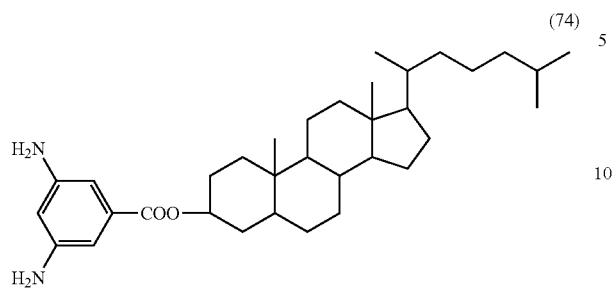

(75)
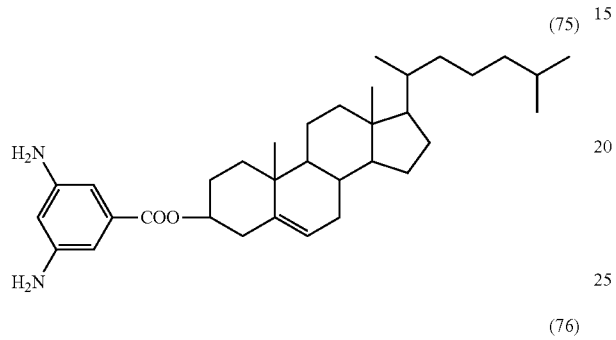

(76)
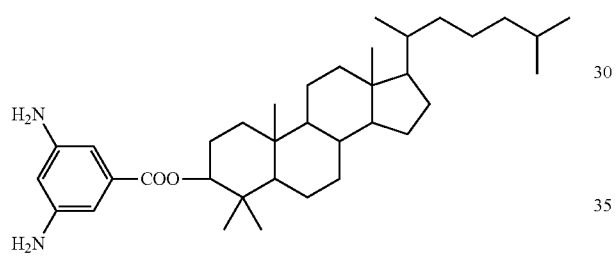

(77)
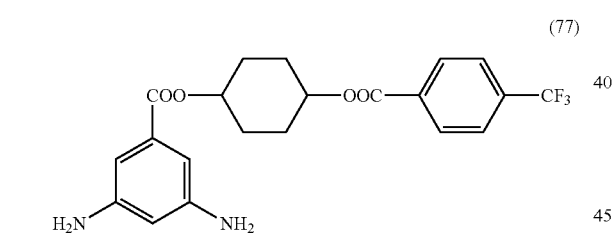

(78)
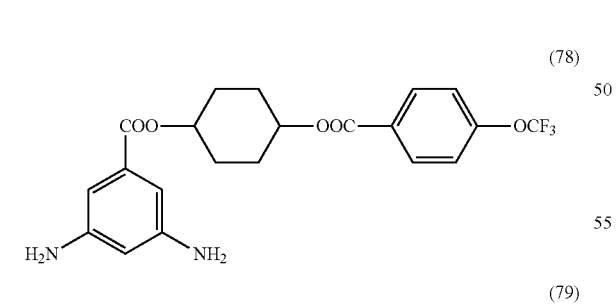

(79)
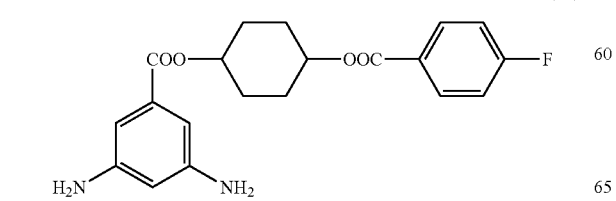

[Chem. 17]

(80)

(81)

(82)

(83)

—Synthesis of Polyamic Acid—

A preferable proportion of tetracarboxylic dianhydride and diamine used in a synthetic reaction of polyamic acid is 0.5 to 2 equivalents, more preferably 0.7 to 1.2 equivalents of the acid anhydride group in the tetracarboxylic dianhydride, with respect to one equivalent of the amino groups in the diamine.

A synthetic reaction of polyamic acid is preferably performed in an organic solvent at a temperature of preferably −20 to 150° C., more preferably 0 to 100° C. Reaction time is preferably 2 to 24 hours, and more preferably 2 to 12 hours. An organic solvent is not especially limited as long as the polyamic acid to be synthesized can be dissolved. Preferable solvents include non-protic polar solvents such as N-methyl-2-pyrrolidone, N, N-dimethylacetamide, N,N-dimethylformamide, dimethyl sulfoxide, γ-butyrolactone, tetramethylurea, and hexamethylphosphor; and phenolic solvents such as m-cresol, xylenol, phenol, and halogenated phenols (hereinafter, referred to as a "specific organic solvent"). The amount (a) of the specific organic solvent is preferably set in a manner that the gross amount (b) of tetracarboxylic dianhydride and a diamine compound is 0.1% to 30% by weight to the total amount (a+b) of a reaction solution. It is to be noted that, when a specific organic solvent is used together with another organic solvent explained below, the amount (a) of the specific organic solvent indicates the total of the specific organic solvent and the another organic solvent.

Examples of the another organic solvent include methyl alcohol, ethyl alcohol, isopropyl alcohol, cyclohexanol, ethylene glycol, propylene glycol, 1,4-butanediol, triethylene glycol, ethylene glycol monomethyl ether, ethyl lactate, butyl lactate, acetone, methyl ethyl ketone, methyl isobutyl ketone, cyclohexanone, methyl acetate, ethyl acetate, butyl acetate, methyl methoxy propionate, ethyl ethoxy propionate, diethyl oxalate, diethyl malonate, diethyl ether, ethylene glycol methyl ether, ethylene glycol ethyl ether, ethylene glycol-n-propyl ether, ethylene glycol-i-propyl ether, ethylene glycol-n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene, isoamyl propionate, isoamyl isobutyrate, and diisopentyl ether.

The proportion of the another organic solvent is preferably 80% by weight or less, more preferably 50% by weight or less, and further preferably 40% by weight or less to the total of the specific organic solvent and the another organic solvent.

The reaction solution comprising a polyamic acid dissolved therein is obtained as mentioned above. This reaction solution may be used in preparation of the liquid crystal alignment agent as it is, after the polyamic acid contained therein is isolated, or after the isolated polyamic acid is purified. The isolation of the polyamic acid is carried out as follows: the reaction solution is poured into a large amount of a poor solvent so that a precipitate is obtained, and the precipitate is dried under reduced pressure; or the solvent of the reaction solution is removed under reduced pressure with use of an evaporator. In addition, the polyamic acid can be purified as follows: the obtained polyamic acid is again dissolved in an organic solvent, and the polyamic acid is isolated with use of a poor solvent; or the removal of the solvent under reduced pressure with use of an evaporator is carried out one or more times.

—Synthesis of Polyimide—

The polyimide is synthesized by the dehydration cyclization of the polyamic acid obtained as above. At this time, the dehydration cyclization may be carried out to the entire amic acid structure so that the polyamic acid is completely imidized. Or alternatively, the dehydration cyclization may be carried out only to a part of the antic acid structure so that the polyamic acid is made into a partially-imidized material comprising an amic acid structure and an imide structure. The imidization rate of the polyimide is preferably not less than 40%, more preferably not less than 80%. "The imidization rate" is a numerical value indicating the rate of the number of imide ring structures to the total of the number of amic acid structures and the number of imide ring structures in polyimide, which is expressed in percentages. At this time, some imide rings may be isoimide rings.

Methods for carrying out dehydration cyclization of polyamic acid include: (i) heating the polyamic acid; or (ii) dissolving the polyamic acid in an organic solvent, adding a dehydrating agent and a dehydration cyclization catalyst to the solution, and heating the solution if needed.

The reaction temperature in the method (i) of heating the polyamic acid is preferably 50 to 200° C., more preferably 60 to 170° C. The reaction temperature lower than 50° C. may fail to allow the dehydration cyclization to fully proceeds, and the reaction temperature higher than 200° C. may decrease the molecular weight of the polyimide to be obtained. The reaction time in the method of heating the polyamic acid is preferably 0.5 to 48 hours, more preferably 2 to 20 hours.

On the other hand, in the method (ii) of adding a dehydrating agent and a dehydration cyclization catalyst to the solution of the polyamic acid, acid anhydrides such as acetic anhydride, a propionic anhydride, and trifluoroacetic anhydride may be used as a dehydrating agent. The amount of the dehydrating agent is preferably 0.01 to 20 mel to one mol of a polyamic acid structural unit. Moreover, tertiary amine such as pyridine, collidine, lutidine, and triethylamine may be used as a dehydration cyclization catalyst.

However, it is not limited only to these. The amount of the dehydration cyclization catalyst is preferably 0.01 to 10 mol to one mol of the dehydrating agent to be used. The organic solvent mentioned as an organic solvent used for synthesis of polyamic acid may be used in the dehydration cyclization. The reaction temperature of the dehydration cyclization is preferably 0 to 180° C., more preferably 10 to 150° C. The reaction time of the dehydration cyclization is preferably 0.5 to 20 hours, more preferably 1 to 8 hours.

The polyimide obtained by the above method (i) may be used in preparation of the liquid crystal alignment agent as it is, or after being purified. In contrast, the reaction solution containing polyimide is obtained by the method (ii). This reaction solution may be used in preparation of the liquid crystal alignment agent as it is, after the dehydrating agent and the dehydration cyclization catalyst are removed from the reaction solution, after the polyimide is isolated, or after the isolated polyamic acid is purified. In order to remove the dehydrating agent and the dehydration cyclization catalyst from the reaction solution, a method such as solvent displacement may be employed. Isolation and purification of polyimide may be performed in the same manner as in isolation and purification of a polyamic acid.

—Terminal Modified Polymer—

Each of the polyamic acid and polyimide may be a terminal modified polymer in which molecular weight is adjusted. Such a terminal modified polymer can be synthesized by adding a proper molecular weight modifier, such as an acid monoanhydride, a monoamine compound, and a monoisocyanate compound, to a reaction system in synthesis of the polyamic acid. Here, examples of the acid monoanhydride include maleic anhydride, phthalic anhydride, itaconic acid anhydride, 30n-decyl succinic acid anhydride, n-dodecyl succinic acid anhydride, n-tetradecyl succinic acid anhydride, and n-hexadecyl succinic acid anhydride. Examples of the monoamine compounds include aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, and n-eicosylamine. Examples of the monoisocyanate compounds include a phenylisocyanate, and, a naphthyl isocyanate.

The proportion of the molecular weight modifier is preferably 5% by weight or less, more preferably 2% by weight or less to the total of tetracarboxylic dianhydride and diamine which are used in the synthesis of the polyamic acid.

The composition for forming a liquid crystal alignment film preferably comprises a solid component (normally, a material for forming a liquid crystal alignment film) at a concentration of 2% to 5% by weight (more preferably, 2.5% to 4.5% by weight). This allows the inkjet printing equipment to print more uniformly. As a result, the development of display unevenness can be suppressed effectively. The concentration of the solid component being less than 2% by weight may lower the viscosity of the composition too much, leading to a failure in stable discharge of the composition for forming a liquid crystal alignment film with use of the inkjet printing equipment. The concentration of the solid component being higher than 5% by weight may increase the viscosity of the composition too much, leading to a failure in stable discharge of the composition for forming a liquid crystal alignment film with use of the inkjet printing equipment.

The composition for forming a liquid crystal alignment film preferably has a surface tension of 28 to 32 mN/m (more preferably 29 to 31 mN/m) at 24° C. Since use of such a composition for forming a liquid crystal alignment film having a low surface tension enhances the liquid spreading on a substrate, more uniform printing becomes possible with use of the inkjet printing equipment. As a result, the development of display unevenness can be suppressed effectively. The surface tension being less than 28 mN/m or more than 32 mN/m at 24° C. may cause a case where the composition is not discharged from the heads of the inkjet printing equipment, which results in a failure in stable discharge of the composition for forming a liquid crystal alignment film with use of the inkjet printing equipment.

The composition for forming a liquid crystal alignment film preferably has a viscosity of 5 to 10 mPa·s (more preferabl.y 6 to 8 mN/m) at 24° C. Thereby, further uniform printing becomes possible with use of the inkjet printing equipment. As a result, the development of display unevenness can be suppressed effectively. The viscosity being less than 5 mPa·s at 24° C. lowers the viscosity of the composition too much, leading to a failure in stable discharge of the composition for forming a liquid crystal alignment film with use of the inkjet printing equipment. The viscosity being more than 10 mPa·s at 24° C. increases the viscosity of the composition too much, leading to a failure in stable discharge of the composition for forming a liquid crystal alignment film with use of the inkjet printing equipment.

The composition for forming a liquid crystal alignment film preferably has the boiling point of 160 to 220° C. (more preferably 180 to 210° C.) at atmospheric pressure. This allows the composition for forming a liquid crystal alignment film having spread on a mother glass uniformly to be dried at uniform speed on the surface of the mother glass. Accordingly, further uniform printing becomes possible with use of the inkjet printing equipment. As a result, the development of display unevenness can be suppressed effectively. In addition, the composition having the boiling point of less than 160° C. at atmospheric pressure may cause a clog in the nozzle of the inkjet printing equipment.

The composition for forming a liquid crystal alignment film preferably spreads not less than 13 mm in a liquid spreading test, and shrinks not more than 100 nm in a liquid shrinkage test. Thereby, still further uniform printing becomes possible with use of the inkjet printing equipment. As a result, the development of display unevenness can be suppressed still more effectively. Especially, it can prevent a defect of a bright spot in a vertical alignment liquid crystal mode. In addition, the liquid spreading of less than 13 mm may cause display unevenness in stripe shape corresponding to the nozzle pitch of the inkjet printing equipment. In contrast, the liquid shrinkage more than 100 nm may cause display unevenness corresponding to the pitch of a pixel or subpixel.

Moreover, the composition for forming a liquid crystal alignment film preferably further contains dipentyl ether, from the similar standpoint. Also by this, still more uniform printing becomes possible with use of the inkjet printing equipment. As a result, the development of display unevenness can be suppressed still more effectively. Especially, it can prevent a defect of the bright spot in a vertical alignment liquid crystal mode.

Though a method for applying the composition for forming a liquid crystal alignment film is not especially limited, inkjet printing is suitable. That is, the composition for forming a liquid crystal alignment film is preferably discharged to the substrate for liquid crystal displays by inkjet printing.

The material for forming a liquid crystal alignment film preferably starts exhibiting a property of controlling alignment of the liquid crystal molecules by photoirradiation. Since this provides a composition for forming a photo-alignment film which is excellent in coating properties, the photo-alignment film excellent in flatness can be formed as a liquid crystal alignment film.

The photo-alignment method has the following merits: the alignment treatment performed in a non-contact manner can suppress generation of the soil and dirt during the alignment treatment; the development of the display defect (for example, rubbing stripe) in mechanical alignment treatment such as the rubbing treatment can be suppressed; and alignment division of each pixel into a plurality of domains having a desired design (plane shape) can be carried out by exposing the alignment film through a photomask having a translucent part which has a desired pattern formed therein.

Thus, the present invention also provides a liquid crystal display having a liquid crystal alignment film formed from the composition for forming a liquid crystal alignment film of the present invention and provided with an alignment treatment by photoirradiation. Since a photo-alignment film excellent in flatness can be formed as a liquid crystal alignment film, the development of display unevenness can be suppressed effectively, while the merit of a photo-alignment method is enjoyed.

The configuration of the liquid crystal display device of the present invention is not especially limited as long as it essentially includes such components. The liquid crystal display device may or may not include other components.

The liquid crystal display device of the present invention normally has a configuration in which a liquid crystal layer containing liquid crystal molecules is interposed between a pair of substrates, and the liquid crystal alignment film is arranged on a liquid crystal layer-side surface of at least one of the pair of substrates (preferably both of the pair of substrates from the standpoint of improving the display quality and responsiveness of the liquid crystal display device).

The liquid crystal display device of the present invention may be a passive matrix liquid crystal display device, but preferably an active matrix liquid crystal display device. Thus, it is preferable that the liquid crystal display device of the present invention includes pixels arranged in a matrix pattern, the pixels including a pixel electrode and a common electrode, the pixel electrode being arranged in a matrix pattern on a liquid crystal layer side-surface of one of the pair of the substrates, and the common electrode being arranged on a liquid crystal layer side-surface of the other substrate.

Alternatively, the liquid crystal display device of the present invention may comprise pixels arranged in a matrix pattern, the pixels including a pixel electrode and a common electrode which are formed on the liquid crystal layer side-surface of the substrate in a comb-tooth shape.

The liquid crystal alignment film is provided with an alignment treatment by photoirradiation (preferably, ultraviolet light-irradiation). So it is preferable that the alignment film is sensitive to light, particularly UV light, and more specifically, it is preferable that the alignment film reacts to light, particularly UV light at a smaller exposure energy in a short time. In order to shorten a tact time in the production process, the liquid crystal alignment film is preferably photoirradiated at an exposure energy of 100 mJ/cm$^2$ or less, and more preferably at an exposure energy of 50 mJ/cm$^2$ or less. If the alignment film is provided with an alignment treatment by compartmentalizing each pixel region into some regions and separately exposing the regions through a light-shielding mask (photomask) and the like, it is preferable that the alignment film is photoirradiated at an exposure energy of 20 mJ/cm² or less.

The liquid crystal alignment film preferably has a thickness of 40 to 150 nm (more preferably 90 to 110 nm) after its pre-baking. When the thickness of the to-be-obtained film is too thin, i.e. less than 40 nm, the composition for forming a liquid crystal alignment film may not be applied uniformly. On the other hand, when the thickness of the to-be-obtained film is too thick, i.e. more than 150 nm, the composition for forming a liquid crystal alignment film. may not be applied uniformly.

The "pre-baking" indicates the process of drying (pre-baking) the layer of the applied composition at 40 to 100° C. after applying the composition for forming a liquid crystal alignment film to a substrate, with aims of preventing the dust deposition to the layer and carrying out the preliminary baking before the post-baking. The method for pre-baking is not especially limited, and examples thereof include vacuum drying, drying with use of a hot plate, and the like.

On the other hand, the "post-baking" indicates the process of drying (post-baking) a temporary-dried film at 120 to 250° C. to carry out dehydration condensation by heating so as to imidize the film, when a polyamic acid solution is used as a solution for forming a liquid crystal alignment film (composition for forming a liquid crystal alignment film). In addition, when a polyimide solution is used as a solution for forming an alignment film (composition for forming a liquid crystal alignment film), the "post-baking" indicates the process of drying (post-baking) a temporary-dried film at 120 to 250° C. in order to completely remove the medium in the film.

The liquid crystal alignment film is preferably obtainable by providing a film with an alignment treatment by photoirradiation, the film being formed from a composition for forming a liquid crystal alignment film, the composition for forming a liquid crystal alignment film comprising a copolymer including as essential constitutional units: a first constitutional unit; and a second constitutional unit, the first constitutional unit starting exhibiting a property of controlling alignment of the liquid crystal molecules by photoirradiation, the second constitutional unit starting exhibiting the property of controlling alignment of the liquid crystal molecules regardless of the photoirradiation. Accordingly, the composition for forming a liquid crystal alignment film preferably comprises a copolymer including as essential constitutional units: the first constitutional unit starting exhibiting a property of controlling alignment of liquid crystal molecules by photoirradiation; and the second constitutional unit starting exhibiting a property of controlling alignment of liquid crystal molecules regardless of the photoirradiation. Further, the liquid crystal alignment film is preferably formed from the composition for forming a liquid crystal alignment film and provided with an alignment treatment by photoirradiation. A liquid crystal alignment film can be formed from a material for forming a liquid crystal alignment film which is excellent in coating properties and includes: a polymer that comprises a monomeric component of a photo-alignment film; and a monometic component of a normal alignment film (an alignment film provided with an alignment treatment by a rubbing method and an alignment film on which no alignment treatment is provided).

The constitutional units derived from two kinds of diamiries in the liquid crystal alignment film (for example, a photo-alignment diamine unit and a vertical alignment diamine unit) preferably align the liquid crystal molecules in the same direction. This effectively drives the liquid crystal display device of the present invention in a single liquid crystal mode such as VATN (Vertical Alignment Twisted Nematic), TN (Twisted Nematic), ECB (Electrically Controlled Birefringence) and IPS (In-Place Switching) modes.

The same direction is not necessarily strictly the same direction as long as a single liquid crystal mode can be achieved.

In the present description, the VATN mode may be a so-called RTN (reverse twist nematic: vertical alignment in TN mode). Further, the ECB mode may be VAECB mode where liquid crystals are vertically aligned during non-voltage application and horizontally aligned during voltage application, or may be mode where liquid crystals are vertically aligned during voltage application and horizontally aligned during non-voltage application.

From the same viewpoint, it is preferable that the liquid crystal alignment film uniformly controls the liquid crystal molecules in a plane of the liquid crystal alignment film. This also effectively drives the liquid crystal display device of the present invention in a single liquid crystal mode such as VATN, ECB, and IPS modes.

In the present description, the term "uniformly" does not necessarily mean that the liquid crystal molecules are aligned strictly uniformly as long as a single liquid crystal mode can be achieved.

In order to effectively drive the liquid crystal display device in VA mode such. as VATN mode, it is preferable that the liquid crystal alignment film is a vertical alignment film that aligns the liquid crystal molecules vertically.

In the present description, the term "vertically" does not necessarily mean that the liquid crystal molecules are aligned strictly vertically to the liquid crystal alignment film surface, and may be aligned vertically to the liquid crystal alignment film surface to such an extent that VA mode such as VATN mode can be achieved.

More specifically, in order to effectively drive the liquid crystal display device in VA mode such as VATN mode, it is preferable that the liquid crystal alignment film aligns the liquid crystal molecules in such a way that an average pretilt angle of the liquid crystal layer is 87° to 89.5°, more preferably 87.5° to 89°. As a result, the liquid crystal display device in VATN mode excellent in viewing angle characteristics, responsiveness, and light transmittance, can be provided.

In order to effectively drive the liquid crystal display device in VA mode such as VATN mode, as mentioned above, it is preferable that a copolymer in the material for forming a liquid crystal alignment film includes a constitutional unit having a side chain including a vertical alignment functional group (for example, vertical alignment diamine unit). As a result, the liquid crystal display device in. VA mode such as VATN mode can be easily provided.

In the present description, the average pretilt angle of the liquid crystal layer is an angle made by a substrate surface and a direction (polar angle direction) of an average profile (director) of liquid crystal molecules in the thickness direction of the liquid crystal layer under no voltage application between the substrates. An apparatus for measuring the average pretilt angle of the liquid crystal layer is not especially limited, and a commercially available tilt angle-measuring apparatus (product of SHINTEC, Inc., trade name: OPTIPRO) may be mentioned, for example. According to this apparatus, a substrate surface is defined as 0° and the direction vertical to this substrate surface is defined as 90°, and the average profile of liquid crystal molecules in the thickness direction of the liquid crystal layer is measured as a pretilt angle. So such an apparatus is preferably used to measure the average pretilt angle. It is considered that the average pretilt angle of the liquid crystal layer depends on a profile of liquid crystal molecules near a liquid crystal alignment film (on an interface between the liquid crystal layer and the liquid crystal alignment film), and the liquid crystal molecules that are positioned on the interface induce elastic deformation of liquid crystal molecules in the bulk (middle) of the liquid crystal layer. In addition, it is considered that the profile of the liquid crystal molecules is different between the vicinity of the liquid crystal alignment film (interface) and the bulk (middle) of the liquid crystal layer, and to be exact, the directions of profiles (polar angle directions) of the liquid crystal molecules are also different between the two.

The following embodiment is preferable in order to effectively drive the liquid crystal display device of the present invention in VATN mode and stably adjust the average pretilt angle of the liquid crystal layer to 87 to 89.5 degrees, which is a suitable angle in VATN mode, and further, more suppress the AC image sticking (image sticking caused by the AC (alternating current) mode). It is preferable that the photoalignment diamine unit in the material for forming a liquid crystal alignment film has a side chain including at least one photofunctional group selected from the group consisting of a coumarin group, a cinnamate group, a chalcone group, an azobenzene group, and a stilbene group. It is preferable that the vertical alignment diamine unit in the material for forming a liquid crystal alignment film has a side chain including a steroid skeleton. The vertical alignment diamine unit in the material for forming a liquid crystal alignment film may have a side chain having a structure in which three to four rings of 1,4-cyclohexylene and/or 1,4-phenylene are linearly bonded to one another directly or with 1,2-ethylene therebetween. That is, the vertical alignment diamine unit in the material for forming a liquid crystal alignment film may have a side chain having a structure where three or four rings are linearly bonded to one another. The three or four rings are each independently selected from 1,4-cyclohexylene and 1,4-phenylene, and the three or four rings are each independently bonded to one another through a single bond or with 1,2-ethylene interposed therebetween.

It is preferable that the liquid crystal display device includes pixels arranged in a matrix pattern, each of the pixels including a pixel electrode and a common electrode, the pixel electrode being arranged in a matrix pattern on a liquid crystal layer side-surface of one of the pair of substrates, the common electrode being arranged on a liquid crystal layer side-surface of the other substrate, wherein each of the pixel includes two or more domains adjacent to each other. This configuration can effectively suppress display unevenness, and the viewing angle can be increased. In addition, in order to increase the viewing angle in all directions, it is preferable that the pixel has four domains. The pixel may be a dot (subpixel).

Thus, it is preferable in the liquid crystal display device that each pixel region is compartmentalized into some regions and the regions are separately exposed (photoirradiated), and thereby alignment division is provided for the device. VATN and ECB mode is preferable as the multi-domain liquid crystal mode. The pixel region may be a dot (subpixel) region.

EFFECT OF THE INVENTION

According to the composition for forming a liquid crystal alignment film of the present invention, it is possible to exert the excellent coating properties even in use for inkjet printing and to form a liquid crystal alignment film excellent in flatness. By using this composition, a liquid crystal display device capable of suppressing the display unevenness can be obtained. Thus, the composition for forming a liquid crystal alignment film of the present invention is suitably used as ink for forming a liquid crystal alignment film by inkjet printing, and can effectively suppress the repelling and/or shrinkage of liquid during the inkjet printing.

BEST MODES FOR CARRYING OUT THE INVENTION

The present invention is mentioned in more detail below with reference to Embodiments using drawings, but not limited to only these Embodiments. In the present Embodiment, a VATN liquid crystal display device is mentioned in detail, but the present invention can be applied to horizontal alignment TN, IPS, and ECB devices. That is, if the present invention is applied to a horizontal alignment device, the following copolymer may be used as a polymer included in an alignment film material (material for forming a liquid crystal alignment film). The copolymer is obtainable by polymerizing a constitutional unit having a side chain not including a vertical alignment functional group (for example, a diamine) or a constitutional unit having a side chain including a hydrophilic functional group or a horizontal alignment functional group (for example, a diamine) with a constitutional unit including a horizontal alignment photofunctional group (for example, a diamine)

Embodiment 1

The present Embodiment is mentioned in the following order: 1. alignment film material (material, for forming a liquid crystal alignment film); 2. preparation method of alignment film; 3. composition for forming a liquid crystal alignment film; and 4. basic operations of liquid crystal display device.

1. Alignment Film Material

The alignment film material (material for forming a liquid crystal alignment film) of the present Embodiment includes a polymer (copolymer) essentially including a first constitutional unit and a second constitutional unit. The first constitutional unit starts exhibiting a property of controlling alignment of liquid crystal molecules by photoirradiation. The second constitutional unit exhibits a property of controlling alignment of liquid crystal molecules regardless of photoirradiation. More particularly, the first constitutional unit has a side chain including a photofunctional group, and the second constitutional unit has a side chain including a vertical alignment functional group. Thus, the side chain of the second constitutional unit contains a functional group that aligns liquid crystal molecules vertically, that is, a functional group that aligns the liquid crystal molecules substantially vertically to the alignment film surface. The essential constitutional units (the first constitutional unit and the second constitutional unit) of the polymer align liquid crystal molecules in the same direction (the same to such an extent that the device can be driven in VATN mode). The alignment film of the present Embodiment, which is obtainable by providing a film with an alignment treatment by photoirradiation, the film being formed from the alignment film material of the present Embodiment, can align liquid crystal molecules uniformly (to such an extent that the device can be driven in VATN mode) in the alignment film plane. Thus, the alignment film of the present Embodiment is a vertical alignment film that controls alignment of liquid crystal molecules substantially vertically to the alignment film surface. It is preferable that the alignment film controls alignment of the liquid crystal molecules in such a way that the average pretilt angle of the liquid crystal layer is 87° to 89.5°, more preferably 87.5° to 89°.

Each of the essential constitutional units is derived from a diamine. That is, the diamine is a monomer component of the essential constitutional units. The polymer of the present Embodiment is a copolymer obtainable by polymerizing a monomer component containing a diamine and an acid anhydride. The polymer of the present Embodiment has a main chain structure of at least one of a polyamic acid and a polyimide. Thus, the liquid crystal display device including the alignment film formed from the alignment film material of the present Embodiment can be effectively driven in VATN mode, and the average pretilt angle of the liquid crystal layer can be stably controlled to 87° to 89.5° (more preferably 87.5° to 89°), which is preferable in VATN mode. In addition, the AC image sticking is effectively suppressed.

The polymer of the present Embodiment is mentioned with reference to FIG. 4. FIG. 4 shows a basic structure of the polymer included in the alignment film material in accordance with the present Embodiment. In FIG. 4, the part encircled by the solid line is a unit derived from an acid anhydride (acid anhydride unit); the part encircled by the dashed line is a unit derived from a diamine for a photo-alignment film, i.e., a diamine having a side chain 21 including a photofunctional group (photo-alignment diamine unit); and the part encircled by the dashed-dotted line is a unit derived from a diamine for a vertical alignment film, i.e., a diamine having a side chain 22 including a vertical alignment functional group (vertical alignment diamine unit). As above, the polymer of the present Embodiment is a copolymer obtainable by polymerizing two diamines that are monomer components of the first and second constitutional units with an acid anhydride. One of the two diamines is a diamine having a side chain 21 including a photofunctional group and the other is a diamine having a side chain 22 including a vertical alignment functional group. The polymer of the present Embodiment is a polyamic acid or a polyimide constituted by the acid anhydride unit and a unit selected from the photo-alignment diamine unit (first constitutional unit) and the vertical alignment diamine unit (second constitutional unit), alternately arranged.

Here, the ratio (second constitutional unit/ the first constitutional unit) of two diamines that are monomer components of the first and second constitutional units may be arbitrarily set within the range of 0 to 1. Namely, the polymer of the present embodiment is a copolymer obtainable by polymerizing one diamine that is a monomer component of the first or second constitutional unit with an acid anhydride. The one diamine may be a diamine having the side chain 21 including a photofunctional group, or a diamine having the side chain 22 including a vertical alignment functional group.

FIG. 5 shows another basic structure of the polymer included in the alignment film material of the present Embodiment. In FIG. 5, the part encircled by the solid line is a unit derived from an acid anhydride (acid anhydride unit); and the part encircled by the dashed-dotted line is a unit derived from a diamine for a photo-alignment film, i.e., a diamine having aside chain 21 including a photofunctional group (photo-alignment diamine unit) or a unit derived from a diamine for a vertical alignment film, i.e., a diamine having a. side chain 22 including a vertical alignment functional group (vertical alignment diamine unit). As shown in FIG. 5, the polymer of the present Embodiment maybe a polymer or copolymer obtainable by polymerizing one or more diamines each having a photofunctional group or a vertical alignment functional group with one or more acid anhydrides.

The side chain included in the photo alignment diamine unit (the first constitutional unit) contains fluorine at its end. In contrast, the side chain included in the vertical alignment diamine unit (the second constitutional unit) may or may not contain fluorine at its end. Here, the vertical alignment diamine unit normally shows hydrophobicity. Therefore, in the polymer of the present Embodiment, the photo alignment diamine unit and the vertical alignment diamine unit serve as hydrophobic parts, and then acid anhydride unit serves as a hydrophilic part. This hydrophobic part is considered to have lowered the coating properties when used for inkjet printing.

The first constitutional unit contains at least one photo-functional group selected from the group consisting of a cinnamate group (the following formula (1)), a chalcone group (the following formula (2)), an azobenzene group (the following formula (3)), a stilbene group (the following formula (4)), a cinnamoyl group, and a coumarin group. These photofunctional groups undergo any of a crosslinking reaction (including a dimerization reaction.), and isomerization, and photorealignment by photoirradiation, thereby exhibiting a function of aligning liquid crystal molecules that are positioned on the alignment film surface in a desired direction depending on photoirradiation conditions such as an irradiation angle. A coumarin derivative includes a compound represented by the following formula (5), for example. Particularly, it is preferable that the first constitutional unit has a side chain including at least one photofunctional group selected from the group consisting of a cinnamate group (absorption wavelength ($\lambda$max) of 270 nm), a chalcone group (absorption wavelength ($\lambda$max) of 300 nm), an azobenzene group (absorption wavelength ($\lambda$max) of 350 nm), and a stilbene group (absorption wavelength ($\lambda$max) of 295 nm). According to this, the liquid crystal display device of the present invention can be effectively driven in VATN mode, and, the average pretilt angle of the liquid crystal layer can be stably controlled within 87° to 89.5° (more preferably, 87.5° to 89°), which is a preferable range for VATN mode. In addition, the AC image sticking is effectively suppressed. These photofunctional groups may be used singly or in combination of two or more species of them.

[Chem. 18]

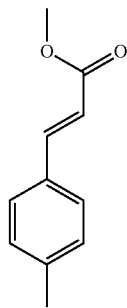

(1)

-continued (2)
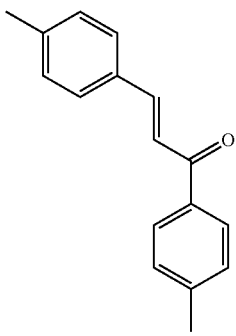

(3)

(4)
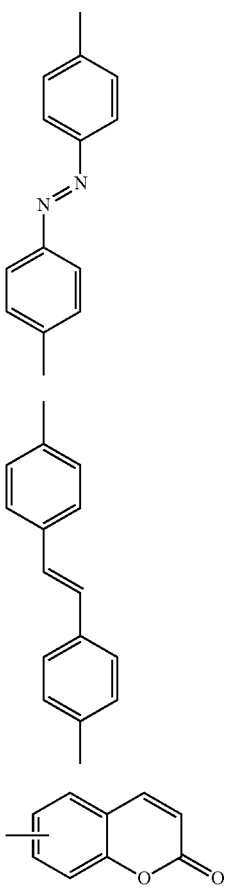

(5)

The second constitutional unit may contain a vertical functional group included in a conventional vertical alignment film. In particular, the second constitutional unit is preferably derived from a diamine represented by the following formula (7), (8), or (9). These diamines may be used singly or in combination of two or more species of them.

[Chem. 19]

(7)
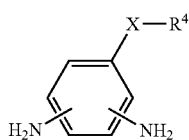

in the formula (7), X representing a single bond, —O—, —CO—, —COO—, —OCO—, —NHCO—, —CONH—, —S—, or an arylene group; and $R^4$ representing an alkyl group with 10 to 20 carbon atoms, a monovalent organic group having an alicyclic skeleton with 4 to 40 carbon atoms, and a fluorine atom-containing monovalent organic group with 6 to 20 carbon atoms.

[Chem. 20]

(8)
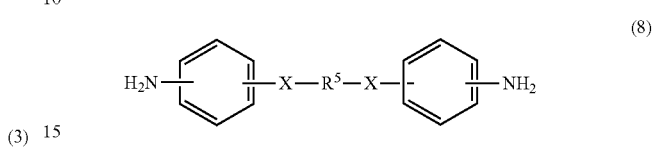

in the formula (8), X representing a single bond, —O—, —CO—, —COO—, —OCO—, —NHCO—, —CONH—, —S—, or an arylene group; and $R^5$ representing an alicyclic skeleton-containing divalent organic group with 4 to 40 carbon atoms.

[Chem. 21]

(9)
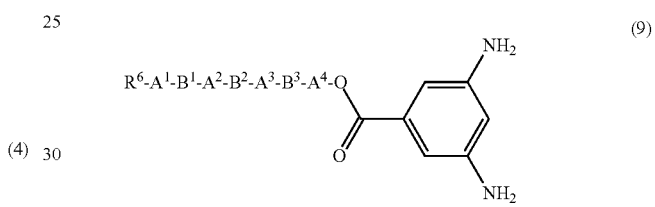

in the formula (9), $A^1$, $A^2$, and $A^3$ being each independently 1,4-cyclohexylene or 1,4-phenylene; $A^4$ representing 1,4-cyclohexylene, 1,4-phenylene or a single bond; $B^1$, $B^2$, and $B^3$ being each independently a single bond or 1,2-ethylene; R6 representing an alkyl with 1 to 20 carbon atoms and one —$CH_2$— in the alkyl may be substituted with —O—.

In the formula (7); examples of the alkyl group with 10 to 20 carbon atoms, represented by $R^4$ include: an n-decyl group, an n-dodecyl group, an n-pentadecyl group, an n-hexadecyl group, an n-octadecyl group, and an n-eicosyl group.

Examples of the organic group having an alicyclic skeleton with 4 to 40 carbon atoms, represented by $R^4$ in the formula (7) and $R^5$ in the formula (8), include: a group containing an alicyclic skeleton derived from cycloalkanes such as cyclobutane, cyclopentane, cyclohexane, and cyclodecane; steroid skeleton-containing groups such as cholesterol and cholestanol; and bridged alicyclic skeleton-containing groups such as norbornene and adamantane. Among them, the steroid skeleton-containing groups are particularly preferable. The organic group having an alicyclic skeleton may be substituted with a halogen atom, preferably a fluorine atom, or a fluoroalkyl group, preferably a trifluoromethyl group.

Examples of the fluorine atom-containing group with 6 to 20 carbon atoms, represented by $R^4$ in the formula (7), include groups obtained by substituting a part or all of hydrogen atoms in the following organic groups with a fluorine atom or a fluoroalkyl group such as a trifluoromethyl group. The organic groups are: straight-chain alkyl groups with 6 or more carbon atoms, such as an n-hexyl group, an n-octyl group, and an n-decyl group; alicyclic hydrocarbon groups with 6 or more of carbon atoms, such as a cyclohexyl group and a cyclooctyl group; and aromatic hydrocarbon groups with 6 or more of carbon atoms, such as a phenyl group and a biphenyl group.

Examples of X in the formulae (7) and (8) include: a single bond, —O—, —CO—, —COO—, —OCO—, —NHCO—, —CONH—, —S—, or an arylene group. Examples of the arylene group include a phenylene group, a tolylene group, a biphenylene group, a naphtylene group. Among them, —O—, —COO—, and —OCO— are still more preferable.

Specific examples of the diamine containing the group represented by the formula (7) preferably include: dodecanoxy-2,4-diaminobenzene, pentadecanoxy-2,4-diaminobenzene, hexadecanoxy-2,4-diaminobenzene, octadecanoxy-2,4-diaminobenzene, and compounds represented by the following formulae (10) to (15).

[Chem. 22]

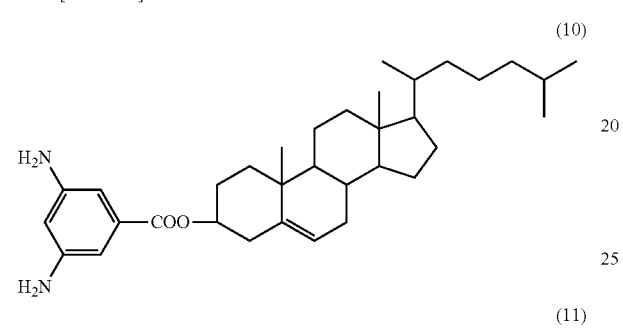
(10)

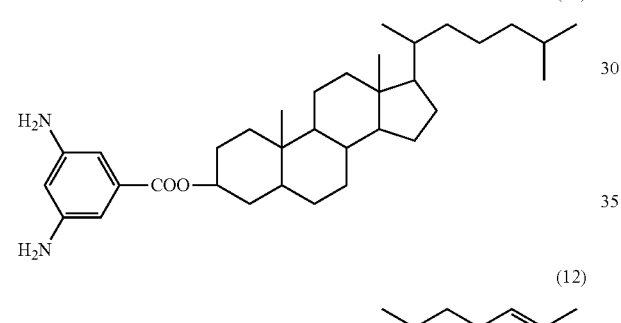
(11)

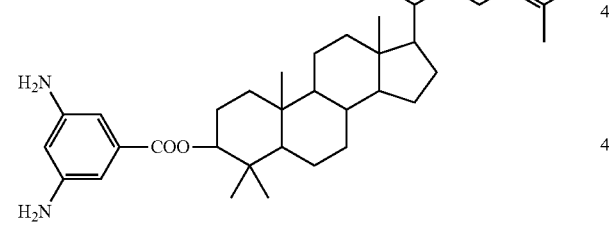
(12)

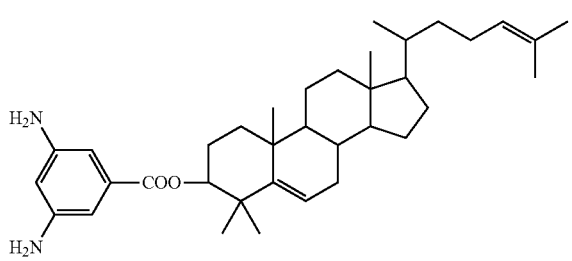
(13)

(14)

(15)

Specific examples of the diamine containing the group represented by the formula (8) preferably include: diamines represented by the following formulae (16) to (18).

[Chem. 23]

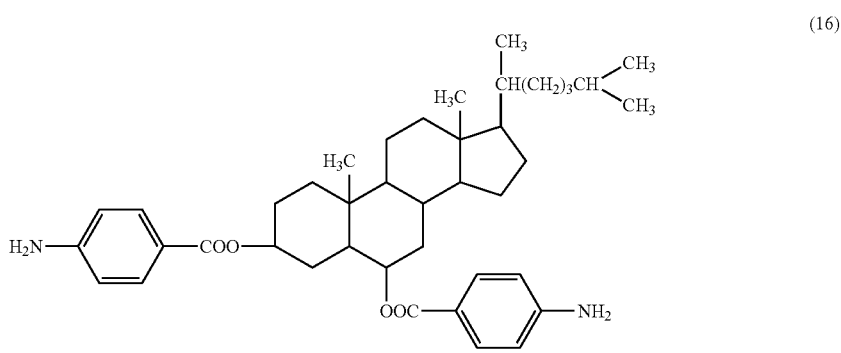
(16)

-continued

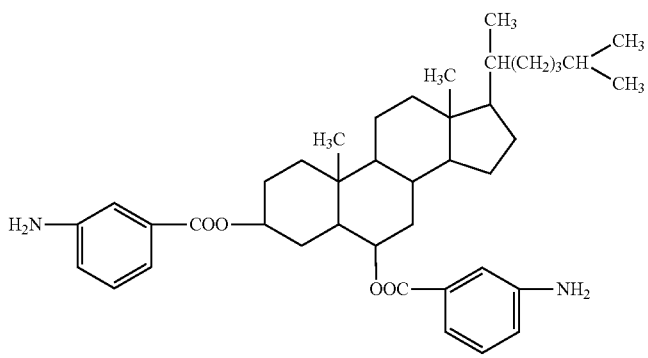

(17)

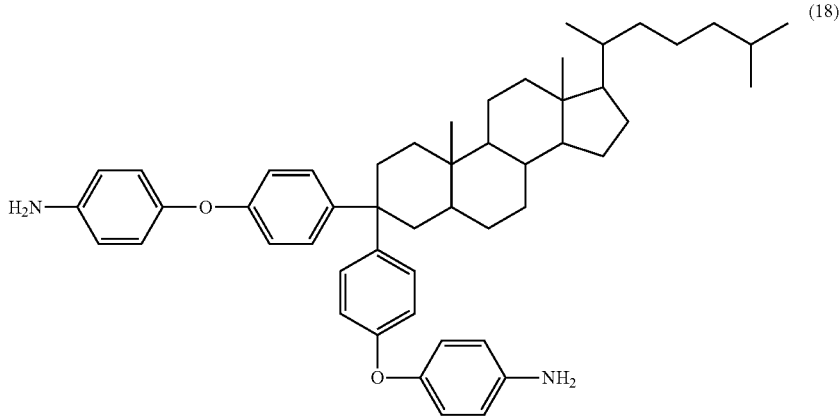

(18)

In the formula (9), $R^6$ is any straight or branched alkyl selected from alkyls with 1 to 20 carbon atoms. One —$CH2$— in the alkyl may be substituted with —O—. Specific examples of the alkyls include: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, isopropyl, isobutyl, sec-butyl, t-butyl, isopentyl, neopentyl, t-pentyl, 1-methyl pentyl, 2-methyl pentyl, 3-methyl pentyl, 4-methyl pentyl, isohexyl, 1-ethyl pentyl, 2-ethyl pentyl, 3-ethyl pentyl, 4-ethyl pentyl, 2,4-dimethyl hexyl, 2,3,5-triethyl heptyl methoxy, ethoxy, propyl oxy, butyloxy, pentyl oxy, hexyl oxy, methoxy methyl, methoxy ethyl, methoxy propyl, methoxy butyl, methoxy pentyl, methoxy hexyl, ethoxy methyl, ethoxy ethyl, ethoxy propyl, ethoxy butyl, ethoxy pentyl, ethoxy hexyl, hexyl oxymethyl, hexyl oxyethyl, hexyl oxypropyl, hexyl, oxybutyl, hexyl oxypentyl, hexyl oxyhexyl. Among them, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and the like are preferably mentioned.

In the formula (9), $B^1$, $B^2$, and $B^3$ each independently represents a single bond or 1,2-ethylene. The number of 1,2-ethylene in the formula (9) is preferably 0 or 1.

In the formula (9), compounds containing some of $R^6$, $A^1$, $A^2$, $A^3$, $A^4$, $B^1$, $B^2$, and $B^3$ in a combination shown in the following Tables 1 to 3 are particularly preferable. In Tables, B represents 1,4-phenylene; Ch represents 1,4-cyclohexylene;—represents a single bond; and E represents 1,2-ethylene. Cis-1,4-cyclohexylene, trans-1,4-cyclohexylene may be mixed, and trans-1,4-cyclohexylene is preferred.

| No. | $R^6$ | $A^1$ | $A^2$ | $A^3$ | $A^4$ | $B^1$ | $B^2$ | $B^3$ |
|---|---|---|---|---|---|---|---|---|
| 1 | Me | Ch | Ch | B | — | — | — | — |
| 2 | n-$C_3H_7$ | Ch | Ch | B | — | — | — | — |
| 3 | n-$C_5H_{11}$ | Ch | Ch | B | — | — | — | — |
| 4 | n-$C_7H_{15}$ | Ch | Ch | B | — | — | — | — |
| 5 | n-$C_{19}H_{25}$ | Ch | Ch | B | — | — | — | — |
| 6 | n-$C_{16}H_{32}$ | Ch | Ch | B | — | — | — | — |
| 7 | n-$C_{20}H_{41}$ | Ch | Ch | B | — | — | — | — |
| 8 | n-$C_3H_7$ | Ch | Ch | B | — | E | — | — |
| 9 | n-$C_5H_{11}$ | Ch | Ch | B | — | E | — | — |
| 10 | n-$C_7H_{15}$ | Ch | Ch | B | — | E | — | — |
| 11 | n-$C_{12}H_{25}$ | Ch | Ch | B | — | E | — | — |
| 12 | n-$C_{15}H_{31}$ | Ch | Ch | B | — | E | — | — |
| 13 | n-$C_{19}H_{39}$ | Ch | Ch | B | — | E | — | — |
| 14 | n-$C_3H_7$ | Ch | Ch | B | — | — | — | — |
| 15 | n-$C_5H_{11}$ | Ch | Ch | B | — | E | — | — |
| 16 | n-$C_7H_{15}$ | Ch | Ch | B | — | — | E | — |
| 17 | n-$C_{12}H_{25}$ | Ch | Ch | B | — | — | E | — |
| 18 | n-$C_{14}H_{29}$ | Ch | Ch | B | — | — | E | — |
| 19 | n-$C_8H_{18}O$ | Ch | Ch | B | — | — | — | — |
| 20 | n-$C_{16}H_{32}O$ | Ch | Ch | B | — | — | — | — |
| 21 | n-$C_{12}H_{25}O$ | Ch | Ch | B | — | E | — | — |
| 22 | n-$C_5H_{11}$ | Ch | B | Ch | — | — | — | — |
| 23 | n-$C_7H_{15}$ | Ch | B | Ch | — | — | — | — |
| 24 | n-$C_{12}H_{25}$ | Ch | B | Ch | — | — | — | — |

TABLE 2

| No. | $R^6$ | $A^1$ | $A^2$ | $A^3$ | $A^4$ | $B^1$ | $B^2$ | $B^3$ |
|---|---|---|---|---|---|---|---|---|
| 25 | n-$C_5H_{11}$ | B | Ch | Ch | — | — | — | — |
| 26 | n-$C_7H_{15}$ | B | Ch | Ch | — | — | — | — |
| 27 | n-$C_{12}H_{25}$ | B | Ch | Ch | — | — | — | — |
| 28 | n-$C_{20}H_{41}$ | B | Ch | Ch | — | — | — | — |
| 29 | n-$C_3H_7$ | B | Ch | Ch | — | E | — | — |

TABLE 2-continued

| No. | $R^6$ | $A^1$ | $A^2$ | $A^3$ | $A^4$ | $B^1$ | $B^2$ | $B^3$ |
|---|---|---|---|---|---|---|---|---|
| 30 | n-C$_7$H$_{15}$ | B | Ch | Ch | — | E | — | — |
| 31 | n-C$_5$H$_{11}$ | B | Ch | Ch | — | — | E | — |
| 32 | n-C$_{18}$H$_{37}$ | B | Ch | Ch | — | — | E | — |
| 33 | n-C$_5$H$_{11}$ | Ch | B | B | — | — | — | — |
| 34 | n-C$_7$H$_{16}$ | Ch | B | B | — | — | — | — |
| 35 | n-C$_{12}$H$_2$ | Ch | B | B | — | — | — | — |
| 36 | n-C$_{16}$H$_{32}$ | Ch | B | B | — | — | — | — |
| 37 | n-C$_{20}$H$_{41}$ | Ch | B | B | — | — | — | — |
| 38 | n-C$_5$H$_{11}$ | Ch | B | B | — | E | — | — |
| 39 | n-C$_7$H$_{15}$ | Ch | B | B | — | E | — | — |
| 40 | n-C$_3$H$_7$ | B | B | Ch | — | — | — | — |
| 41 | n-C$_7$H$_{15}$ | B | B | Ch | — | — | — | — |
| 42 | n-C$_{12}$H$_{25}$ | B | B | Ch | — | — | — | — |
| 43 | n-C$_5$H$_{11}$ | B | B | B | — | — | — | — |
| 44 | n-C$_7$H$_{15}$ | B | B | B | — | — | — | — |
| 45 | n-C$_5$H$_{11}$ | Ch | Ch | Ch | B | — | — | — |
| 46 | n-C$_7$H$_{15}$ | Ch | Ch | Ch | B | — | — | — |
| 47 | n-C$_{12}$H$_{25}$ | Ch | Ch | Ch | B | — | — | — |
| 48 | n-C$_3$H$_7$ | Ch | Ch | B | B | — | — | — |

TABLE 3

| No. | $R^6$ | $A^1$ | $A^2$ | $A^3$ | $A^4$ | $B^1$ | $B^2$ | $B^3$ |
|---|---|---|---|---|---|---|---|---|
| 49 | n-C$_5$H$_{11}$ | Ch | Ch | B | B | — | — | — |
| 50 | n-C$_7$H$_{15}$ | Ch | Ch | B | B | — | — | — |
| 51 | n-C$_{14}$H$_{29}$ | Ch | Ch | B | B | — | — | — |
| 52 | n-C$_{20}$H$_{41}$ | Ch | Ch | B | B | — | — | — |
| 53 | n-C$_3$H$_7$ | Ch | Ch | B | B | E | — | — |
| 54 | n-C$_7$H$_{15}$ | Ch | Ch | B | B | E | — | — |
| 55 | n-C$_{12}$H$_{25}$ | Ch | Ch | B | B | E | — | — |
| 56 | n-C$_3$H$_7$ | Ch | Ch | B | B | — | E | — |
| 57 | n-C$_5$H$_{11}$ | Ch | Ch | B | B | — | E | — |
| 58 | n-C$_7$H$_{15}$ | Ch | Ch | B | B | — | E | — |
| 59 | n-C$_7$H$_{15}$ | B | B | Ch | Ch | — | — | — |
| 60 | n-C$_{14}$H$_{29}$ | B | B | Ch | Ch | — | — | — |
| 61 | n-C$_{20}$H$_{41}$ | B | B | Ch | Ch | — | — | — |
| 62 | n-C$_5$H$_{11}$ | B | B | Ch | Ch | — | E | — |
| 63 | n-C$_7$H$_{15}$ | B | B | Ch | Ch | — | E | — |
| 64 | n-C$_7$H$_{15}$ | B | B | Ch | Ch | — | — | E |
| 65 | n-C$_{14}$H$_{29}$ | B | B | Ch | Ch | — | — | E |
| 66 | n-C$_5$H$_{11}$ | B | Ch | Ch | Ch | — | — | — |
| 67 | n-C$_7$H$_{15}$ | B | Ch | Ch | Ch | — | — | — |
| 68 | n-C$_5$H$_{11}$ | Ch | B | B | B | — | — | — |
| 69 | n-C$_7$H$_{15}$ | Ch | B | B | B | — | — | — |

Specific examples of the diamine containing the group represented by the formula (9) preferably include a diamine represented by the formula (19).

[Chem. 24]

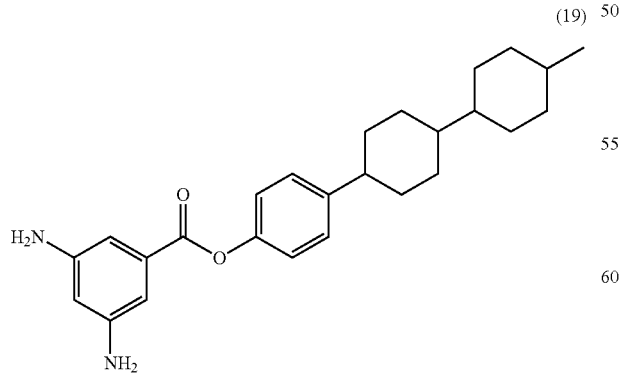

(19)

Thus, it is preferable that the second constitutional unit has a side chain having a steroid skeleton or a side chain having a structure in which three or four rings selected from 1,4-cyclohexylene and 1,4-phenylene are linearly bonded to one another directly or with 1,2-ethylene therebetween. That is, the second constitutional unit may be the following unit. The unit has a side chain having a structure where three or four rings are linearly bonded to one another, the three or four rings being each independently selected from 1,4-cyclohexylene and 1,4-phenylene, and the three or four rings being each independently bonded to one another through a single bond or with 1,2-ethylene therebetween. Alternatively, the unit has a side chain having a steroid skeleton. Thus, the liquid crystal display device of the present invention can be effectively driven in VATN mode, and the average pretilt angle of the liquid crystal layer can be stably controlled within the range of 87° to 89.5° (preferably 87.5° to)89°, which is a preferable range for VATN mode. In addition, the AC image sticking is effectively suppressed.

The following acid anhydrides are preferable as the acid anhydride used for the copolymer of the present Embodiment. An acid anhydride (PMDA) represented by the formula (20), an acid anhydride (CBDA) represented by the formula (21), an acid anhydride (BPDA) represented by the formula (22), an acid anhydride (exoRDA) represented by the formula (23), an acid anhydride (BTDA) represented by the formula (24), an acid anhydride (TCA) represented by the formula (25), an acid anhydride (NDA) represented by the formula (26). These acid anhydrides may be used single or in combination of two or more species of them.

[Chem. 25]

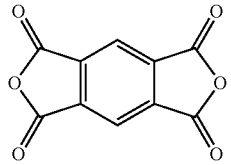

(20)

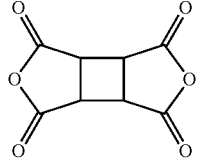

(21)

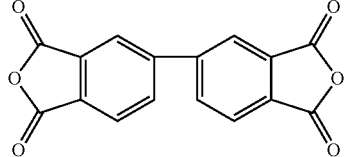

(22)

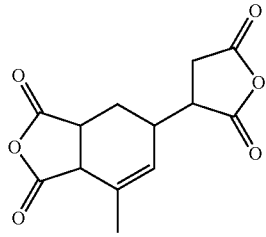

(23)

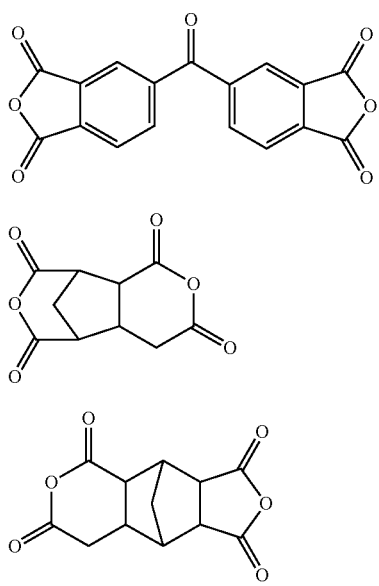

(24)

(25)

(26)

The copolymer of the present Embodiment may be a polyamide, a polyamide-imide, or a polysiloxane. That is, the copolymer of the present Embodiment may have a main chain structure of a polyamide. In this case, the copolymer of the present Embodiment can be formed by polymerizing the first and second constitutional units, with a dicarboxylic acid. The copolymer of the present Embodiment may have a main chain structure of a polysiloxane, i.e., a main chain structure containing a siloxane bond (≡Si—O—Si≡).

The copolymer of the present Embodiment may include the first constitutional unit containing a photofunctional group that undergoes a decomposition reaction by photoirradiation. In order to suppress a variation in pretilt angle, it is preferable that the first constitutional unit includes a photofunctional group that undergoes any one of a crosslinking reaction (including a dimerization reaction), isomerization, and photorealignment by photoirradiation, as mentioned above. Polyvinyl alcohols, polyamides, and polyimides, and the like, are mentioned as an alignment film material that undergoes a photodecomposition reaction (decomposition reaction generated by light), thereby providing liquid crystals with a pretilt angle.

Compared with conventional photo-alignment films, an improvement in coating properties of an ink including the alignment film material of the present Embodiment when the ink is printed by spin coating, flexography, inkjet printing, and the like can be expected. Since the above-mentioned photo-alignment diamine unit contains a fluorine atom at an end of its side chain with the aim of improving electrical characteristics such as a VHR and residual DC, the unit shows high hydrophobicity. That is, an ink including a homopolymer of a conventional photo-alignment diamine unit commonly exhibits insufficient coating properties for a substrate. In contrast, the copolymer of the present Embodiment, obtained by copolymerizing the photo-alignment diamine unit and the vertical alignment diamine unit, contains the photo-alignment diamine unit in a smaller amount, and so a proportion of the fluorine in the polymer can be decreased. In addition, the vertical alignment diamine unit generally has lower hydrophobicity than that of fluorine. Accordingly, the coating properties for a substrate can be more improved as the introduction ratio of the vertical alignment diamine unit is increased.

The present invention can be applied to horizontal alignment mode such as TN, ECB, and IPS modes. In this case, a horizontal alignment film to be formed may include a copolymer of an imide derivative, an amide derivative, and the like, containing a photofunctional group with an imide derivative, an amide derivative, and the like, not containing a photofunctional group.

2. Preparation Method of Alignment Film

A preparation method of the alignment film of the present Embodiment is mentioned below.

First, the monomer components of the first and second constitutional units are copolymerized with an acid anhydride by a publicly known method.

A varnish (ink, composition for forming a liquid crystal alignment film) for applying (printing) the polymer to a substrate is prepared. The varnish preferably includes a mixed solvent (medium) containing solvents such as γ-butyl lactone (BL), N-methyl pyrrolidone (N-methyl-2-pyrrolidone, NMP), butyl cellosolve (BC), diethyl ether dibutyl glycol (DEDG), diisobutyl ketone (DIBK), and dipentyl ether (DPE).

The varnish is applied to a substrate by inkjet printing

After being printed on the substrate, the varnish is pre-baked with a hot plate for pre-baking and then post-baked with a hot plate for post-baking. In the pre-baking and post-baking, the temperature and heating time may be appropriately determined. The heating time is preferably determined in consideration of an equipment tact time. The temperature is preferably determined in consideration of temperature dependence of electrical characteristics of the alignment film material and equipment capability. The thickness of the alignment film of the present Embodiment after the pre-baking is preferably 40 to 150 nm (more preferably 90 to 110 nm)

Next, the alignment film formed on the substrate is provided with an alignment treatment by photoirradiation. Conditions of the irradiation to the alignment film may be appropriately determined. It is preferable that the alignment film is irradiated (exposed) with light including UV light, and it is more preferable that the alignment film is irradiated with UV light. In order to shorten a tact time in the production process, the alignment film is irradiated with light at an exposure energy of 100 mJ/cm$^2$ or less, and more preferably 50 mJ/cm$^2$ or less. If the alignment film is provided with an alignment treatment by compartmentalizing each pixel (subpixel) region into some regions and separately exposing the regions through a light-shielding mask (photomask) and the like, it is preferable that the alignment film is irradiated with light at an exposure energy of 20 mJ/cm$^2$ or less. Other irradiation conditions (for example, existence of polarized light, irradiation angle) may be appropriately determined.

Thus, the alignment film of the present Embodiment is formed and provided with the alignment treatment. As a result, the alignment film of the present Embodiment has a structure derived from a photofunctional group, preferably at least one structure selected from the group consisting of a photofunctional group-bonding structure, a photoisomerization structure, and a photo-alignment structure. Further, the alignment film provides liquid crystal molecules with a substantially uniform pretilt angle in the alignment film plane.

The photofunctional group-bonding structure is a structure resulting from bonding of photofunctional groups by photoirradiation. It is preferable that this structure is formed through a crosslinking reaction (including a dimerization reaction).

The photofunctional group-photoisomerization structure is a structure resulting from isomerization of a photofunctional group by photoirradiation. Accordingly, the first constitutional unit has, for example, a structure obtained when a cis-(trans-) photofunctional group is changed into its trans-(cis-) photofunctional group through an excitation state by photoirradiation.

The photofunctional group-photorealignment structure is a structure resulting from photorea.lignment of a photofunctional group. The photorealignment means that a photofunctional group changes only its direction by photoirradiation without being isomerized. Accordingly, the first constitutional unit has, for example, a structure obtained when a cis-(trans-) photofunctional group changes its direction through an excitation state without being isomerized by photoirradiation.

3. Composition for Forming a Liquid Crystal Alignment Film

Below, the preparation method of ink (a varnish, composition for forming a liquid crystal alignment film) is more specifically described.

Ink having a viscosity of 5 to 10 mPa·s and a surface tension of 28 to 32 mN/m has been known as ink that can be spread uniformly with inkjet printing equipment. However, the correlation is not observed between the physical properties of ink in this range and the actual result of inkjet printing using this ink. Therefore, the evaluation has been needed to be carried out with respect to each physical properties, liquid spreading, and liquid shrinkage, under conditions more close to those for the actual inkjet printing.

[Evaluation on Liquid Spreading of Ink; Liquid Spreading Test]

The evaluation method of liquid spreading of ink is as mentioned below. FIG. 6 is a schematic perspective view showing the dropping process of the ink in a liquid spreading test.

(Preparation of a Substrate)

A substrate (TFT substrate) for dropping ink thereon was prepared by processing a substrate in the following flow. (a) The substrate was processed with a dry cleaning device using an excimer lamp for 150 seconds.

(b) Ultrasonic cleaning was performed on the substrate in 2% by weight of NaOHaq for 20 minutes.

(c) The substrate was flushed with pure water mist for three minutes.

(d) Ultrasonic cleaning (three minutes) was performed on the substrate in pure water twice in different tubs.

(e) The substrate was dried in a rotary dryer.

(Dropping of Ink and Measurement of Spreading Size)

Ink was dropped on the substrate for dropping ink thereon and the liquid spreading thereof was measured in the following flow.

(a) The substrate for dropping ink thereon was blown with $N_2$.

(b) A disposable tip (manufactured by BIOHIT JAPAN, trade name: Tip compatible with Proline Electronic Pipette, product code: 790010) was attached to an electronic control micro pipette (manufactured by BIOHIT JAPAN, trade name: Praline Electronic Pipette, product code: 710520).

(c) The tip was filled with an alignment agent (ink).

(d) The electronic control micro pipette was set to the stand (manufactured by BIOHIT JAPAN, trade name; One-place charging stand, product code; 510004) (The distance between the tip top and the substrate for dropping ink thereon was about 5 cm); and (e) An amount of 10 of an alignment agent (ink) 32 was respectively dropped in three sites on a substrate 42 for dropping ink thereon from an electronic control micro pipette 41.

In order to avoid a state where the dropped liquid was spread and connected to each other, the interval of each dropping site was set to about 10 cm. The agent was dropped at the arbitrary sites on the substrate for dropping ink thereon.

(f) After air drying, the liquid-spreading size of each site was measured with use of a vernier caliper.

Since the liquid spreading showed directional movement under the influence of a wiring pattern of the TFT substrate, the liquid spreading in vertical and parallel directions with respect to the gate line was measured and the average size was obtained.

[Evaluation on Liquid Shrinkage of Ink; Liquid Shrinkage Test]

The evaluation method of the liquid shrinkage of ink is as mentioned below.

(a) After performing spin-coating (5 sec./500 rpm, 20 sec./2000 rpm) to the substrate (TFT substrate) for dropping ink thereon processed as mentioned above, the substrate was held for about a minute and pre-baked for 60 seconds with the hot plate heated to 80° C. The substrate after pre-baking had a thickness of 100 nm.

(b) The number of interference fringe was checked by using a microscope (50 magnifications) in the state where the ink irradiated with a monochromatic light (550 nm), and the level difference d was calculated using the following formula. This level difference d was the evaluation value of liquid shrinkage.

$$d = m \times \lambda / (2 \times n)$$

In the formula, m represents the number of interference fringe, λ represents 550, and n represents 1.5.

The conventional ink for forming a vertical alignment film, which was capable of providing a quite uniform coating when used for inkjet printing, showed the liquid spreading of not less than 13 mm and the liquid shrinkage of 100 nm or less.

[Dependence on the Kind of the Medium in the Ink]

From the standpoint of the solubility of the alignment film material, the following media were found to be usable in an ink for forming a liquid crystal alignment film. Each of plural kinds of inks having different compositions was evaluated with regard to the liquid spreading and the liquid shrinkage on the substrate for dropping ink thereon processed as described above. γ-butyrolactone (BL) and N-methylpyrrolidone (NMP) were studied as good solvents (medium capable of well dissolving alignment film polymer, e.g. a medium completely dissolving an alignment film material at 24° C. when the medium is set to have a solid content of 2% to 10% by weight). Moreover, butyl cellusolve (BC), diethylene glycol diethyl ether (DEDG), butyl acetate (BA), pentyl acetate (PA), diisobutyl ketone (DIBK), hexyl acetate (HA), and dipentyl ether (DPE) were studied as poor solvents (medium capable of dissolving only a small amount of alignment film polymer, e.g. a medium not completely solving a material for forming an alignment film at 24° C. when the medium is set to have a solid content of 2% to 10% by weight). Here, unless otherwise indicated, the ratio of the solvents shown below indicates a weight ratio.

[Comparison of DEDG and BC]

FIG. 7 shows comparison results of evaluations on the liquid spreading and the liquid shrinkage with respect to the inks containing: a mixed solvent of BL/NMP=20/30 as a good solvent and BC as a poor solvent; a mixed solvent of BL/NMP=20/30 as a good solvent and DEDG as a poor solvent; a mixed solvent of BL/NMP=20/30 as a good solvent and a mixed solvent of BC/a poor solvent other than BC and DEDG (PA, HA, or DIBK) =40/10 as a poor solvent; or a mixed solvent of BL/NMP=20/30 as a good solvent and a mixed solvent of DEDG/a poor solvent other than BC and DEDG (PA, HA, or DIBK)=40/10 as a poor solvent.

The larger liquid spreading was observed with respect to the systems comprising DEDG mixed therein. Moreover, the ink 8 of a system comprising DIBK mixed therein is most preferable. The smaller liquid shrinkage was observed with respect to the systems comprising DEDG mixed therein Among these, the ink 2 comprising BL/NMP/DEDG=20/30/40 is most preferable. Accordingly, the ink 8 shows the liquid shrinkage at the same level as the ink 1 and the improved liquid spreading compared to that of the ink 1.

In vertical alignment liquid crystal mode, it is important that the liquid spreading of ink is not less than 13 mm in order to prevent the defect of a bright spot. The ink 8 showed the liquid spreading of not less than 13 mm and the smaller liquid shrinkage. The ink 8 is a DEDG system and comprises DIBK. However, the liquid shrinkage properties thereof have to be still improved.

[Dependence on BL Ratio of Ink]

The dependence on BL ratio was studied with respect to the ink 2 and the ink 8 that showed good liquid spreading and liquid shrinkage properties in the evaluation on the dependence on the kind of the medium in the ink. FIG. 8 shows comparison results of evaluations on the dependence of the liquid spreading and liquid shrinkage of the ink on the BL ratio. Since it had been already clear that BL had a larger surface tension compared to other constituting solvents, we presumed that it was preferable to lower the ratio of BL. And as we presumed, the liquid spreading is reduced along with the increase in the BL ratio, and the liquid shrinkage has reached the minimum value when the BL ratio was 25%. However, since the liquid spreading was 13 mm or less, it was presumable that a bright spot might occur in the vertical alignment liquid crystal mode.

[Effect of Addition of 1% by Weight of DPE]

Comparison between the ink 8 and the ink 9 clarified that DPE significantly improved the liquid spreading but worsened the liquid shrinkage, in the experiment of the dependence on the kind of the solvents in the ink (see FIG. 9 mentioned later). In order to further improve the liquid spreading and the liquid shrinkage properties, 1% by weight of DPE was added to each of the ink 8 and 23 to investigate its effect. FIG. 9 shows the results of evaluation and comparison of the dependence on the addition of 1% by weight of DPE of the liquid spreading and the liquid shrinkage of ink. The liquid spreading and the liquid shrinkage have improved in the ink 26 that is obtained by adding 1% by weight of DPE to the ink 8, and the ink 27 that is obtained by adding 1% by weight of DPE to the ink 23. The ink 26 and 27 satisfied the condition of the liquid spreading being not less than 13 mm and the liquid shrinkage being 100 mm or less, and therefore, it is possible to uniformly apply them with use of inkjet printing equipment. Moreover, the similar results were obtained with respect to the ink added with 1% by weight of DPE in place of an equivalent amount of DIBK reduced therefrom, namely, BL/NMP/DEDG/DIBK/DPE=20/30/40/9/1 or BL/NMP/DEDG/DIBK/DPE=30/20/40/9/1.

[Dependence on the Solid Component Concentration of Ink]

FIG. 10 shows the results of evaluation and comparison of the dependence of the liquid shrinkage and the liquid spreading on the solid component concentration of ink. The liquid shrinkage and the liquid spreading have improved along with decrease in the solid component (alignment film material, polymer in the present embodiment) concentration from 3% by weight or 4% by weight to 2.8% by weight and 2% by weight. However, the viscosity of the ink having the solid component concentration of 2% by weight was too low to allow inkjet printing equipment to stably discharge the ink, which might become a cause of a bright spot. Here, the viscosity of the ink is preferably 5 to 10 mPa·s so as to allow inkjet printing equipment to stably discharge the ink.

[Study on Viscosity Adjustment]

Then, the liquid spreading and the liquid shrinkage were evaluated with respect to the ink having the adjusted viscosity of 7 mPa·s. FIG. 11 shows the result of the study on viscosity adjustment of ink. The ink B had the same composition as the ink F. However, their polymerization degrees were adjusted by changing the reaction conditions of polymers as solid components of the ink. More specifically, the viscosity of the ink B was 5 mPa·s at 24° C., and the viscosity of the ink F was 7 mPa·s at 24° C. The composition of the solvent was fixed to BL/NMP/DEDG/DIBK=20/30/40/10 in each of the ink.

It was found out that the solvent system of NMP/DEDG/DIBK =30/50/20 showed the liquid spreading of not less than 13 mm and the liquid shrinkage of 100 nm or less. Further, it was found out that the system of the ink 8 having the viscosity adjusted to 7 mPa·s showed the liquid spreading of not less than 13 mm and the liquid shrinkage of 100 nm or less.

The results indicated that a system showing desirable liquid spreading and liquid shrinkage properties was (1) ink containing DEDG/DIBK=40/10 as poor solvents. In addition, it is also found out that (2) ink added with 1% by weight of OPE showed further improved liquid spreading and liquid shrinkage properties. Further, it was found out that (3) ink containing at least NMP as a good solvent is preferable.

[Influence on Coating Properties of Alignment Film Material]

Alignment film materials (polymer) having the ratio of (second constitutional unit)/(the first constitutional unit) of 0/100, 8/92, 15/85, 25/75, 40/60, and 50/50 were respectively dissolved in the medium of BL/NMP/DEDG/DIBK=20/30/40/10. The liquid spreading and liquid shrinkage properties thereof were evaluated. The results showed that the coating properties improved along with decrease in the percentage of the first constitutional unit (photo alignment diamine unit) containing fluorine. This is presumably because of the lowered concentration of fluorine in the polymer. The lowered concentration of fluorine in the polymer lowers the surface active effect, resulting in declining of the micell formation.

4. Basic Operation of Liquid Crystal Display Device

The basic operation of the liquid crystal display device of the present Embodiment is mentioned below. FIG. 12 is a perspective view schematically showing a relationship between a photo-alignment treatment direction and a pretilt direction of a liquid crystal molecule in accordance with Embodiment 1. FIG. 13(*a*) is a plan view schematically showing a director alignment of liquid crystal in one pixel (one sub-pixel); and directions of photo-alignment treatment for a pair of substrates (upper and lower substrates) in the case that the liquid crystal display device in Embodiment 1 is a mono-domain device. FIG. 13(*b*) is a schematic view showing directions of absorption axes of polarization plates arranged in the liquid crystal display device shown in FIG. 13(*a*). FIG. 13(*a*) shows a state where the photo-alignment treatment directions are perpendicular to each other between a pair of substrates and an AC voltage not lower than a threshold voltage is applied between the pair of substrates. In FIG. 13(*a*), the solid arrow shows a direction of photoirradiation (a direction of photo-alignment treatment) for a lower substrate; and the dotted arrow shows a direction of photoirradiation (a direction of photo-alignment treatment) for an upper substrate. FIG. 14(*a*) is a plan view schematically showing a director alignment of liquid crystal in one pixel(one sub-pixel); and directions of photo-alignment treatment for a pair of substrate (upper and lower substrates) in the case that the liquid crystal display device in Embodiment 1 is a mono-domain device. FIG. 14(*b*) is a schematic view showing directions of absorption axes of polarization plates arranged in the liquid crystal display device shown in FIG. 14(*a*). FIG. 14(*a*)shows a state where photo-alignment treatment directions are parallel and opposite to each other between the pair of substrates and an AC voltage not lower than a threshold voltage is applied between the pair of substrates. In FIG. 14(*a*), the solid arrow shows a direction of photoirradiation (a direction of photo-alignment treatment) for a lower substrate; and the dotted arrow shows a direction of photoirradiation (a direction of photo-alignment treatment) for an upper substrate. The operation principle of the liquid crystal display device of the present Embodiment is mentioned with reference to FIGS. 12 to 14.

According to the liquid crystal display device of the present Embodiment, a liquid crystal layer containing liquid crystal molecules (nematic liquid crystal) with negative dielectric anisotropy is interposed between a pair of substrates (upper and lower substrates). Each of the pair of substrates includes an insulating transparent substrate such as a glass substrate. On a liquid crystal layer side-surface of each substrate, a transparent electrode is formed. On the transparent electrode, the above-mentioned vertical alignment film is formed. One of the pair of substrates functions as a driving element substrate (for example, TFT substrate) having a driving element (a switching element) formed in every pixel (every sub-pixel). The other functions as a color filter substrate having a color filter formed to face each pixel (each sub-pixel) of the driving element substrate. That is, in the liquid crystal display device of the present Embodiment, one of the pair of substrates (upper and lower substrates) is a color filter substrate and the other is a driving element substrate. In the driving element substrate, the transparent electrode that is connected to the driving element and arranged in a matrix pattern functions as a pixel electrode. In the color filter substrate, the transparent electrode that is uniformly formed over the entire display region functions as a counter electrode (common electrode). Polarization plates are each arranged on a surface on the side opposite to the liquid crystal layer side of each substrate in a Cross-Nicol state for example. Between the pair of substrates, a cell gap controlling member (spacer) for controlling a constant cell gap is arranged at a specific position (in non-display region). The material for the substrates, the transparent electrodes, and the liquid crystal molecules, and the like, are not especially limited.

As shown in FIG. 12, the alignment film 10 of the present embodiment provides liquid crystal molecules 11 with a pretilt angle in an UV-irradiation direction if being irradiated with UV light polarized parallel to an incident face (shown by the outline arrow in FIG. 12), for example, from a direction making an angle of 40 degrees with the normal direction of the substrate face. The alignment film 10 may be exposed by shot exposure or scanning exposure. That is, the alignment film 10 may be irradiated with UV light with the substrate and a light source being fixed. As shown in the dotted arrow in FIG. 12, the alignment film 10 may be irradiated with UV light by being scanning with UV light in the UV scanning direction.

In the liquid crystal display device of the present Embodiment, exposure for the alignment films and attachment of the pair of substrates (upper and lower substrates 12) may be performed so that a direction of photoirradiation to one of the pair of substrates is substantially perpendicular to a direction of photoirradiation to the other substrate when the pair of substrates are viewed in plane as shown in FIG. 13(*a*). Liquid crystal molecules near the alignment films arranged on the upper and lower substrates 12 may have substantially the same pretilt angle. Liquid crystal materials free from a chiral material may be injected between the substrates as a liquid crystal layer. In this case, by applying an AC voltage not less than a threshold voltage value between the upper and lower substrates 12, liquid crystal molecules twist 90° in the normal direction of the substrate plane between the upper and lower substrates 12, and as shown in FIG. 13, the average liquid crystal director alignment 17 under AC voltage application is in a direction bisecting an angle made by the directions of photoirradiation to the upper and lower substrates 12 when the substrates are viewed in plane. As shown in FIG. 13(*b*), a direction of an absorption axis of a polarization plate (upper polarization plate) arranged on the upper substrate side is the same as a direction of photoirradiation to the upper substrate, and a direction of an absorption axis of the other polarization plate (lower polarization plate) arranged on the lower substrate side is the same as a direction of photoirradiation to the lower substrate. The liquid crystal display device of the present invention, produced through the above-mentioned alignment treatment for the alignment films and arrangement of the polarization plates, is a so-called VATN device.

In the liquid crystal display device of the present Embodiment, exposure for the alignment films and attachment of the substrates may be performed so that directions of photoirradiation to the upper and lower substrates 12 are substantially parallel and opposite to each other when the substrates are viewed in plane, as shown in FIG. 14(*a*). Liquid crystal molecules near the alignment films arranged on the upper and lower substrates 12 may have substantially the same pretilt angle. Liquid crystal materials free from a chiral material may be injected between the substrates as a liquid crystal layer. In this case, when no voltage is applied between the upper and lower substrates 12, liquid crystal molecules near the interface between the liquid crystal layer and the upper and lower substrates 12 have a homogeneous structure (homogeneous alignment) where the liquid crystal molecules have a pretilt angle of about 88.5°. As shown in FIG. 14(*a*), the average liquid crystal director alignment 17 under AC voltage application is in the direction of photoirradiation to the upper and lower substrates 12 when the substrates are viewed in plane. As shown in FIG. 14(*b*), directions of absorption axes of the polarization plates (upper and lower polarization plates) arranged on the upper and lower substrates are different from directions of photo-alignment treatment for the upper and lower substrates by 45° when the substrates are viewed in plane. The liquid crystal display device of the present invention, produced through the above-mentioned alignment treatment for the alignment films and arrangement of the polarization plates, is a so-called VAECB (vertical alignment electrically controlled birefringence) device where the directions of photoirradiation to the upper and lower substrates are opposite and parallel to each other and liquid crystal molecules are vertically aligned. In FIG. 14, the solid arrow shows a direction of photoirradiation (a direction of photo-alignment treatment) to the lower substrate, and the dotted arrow shows a direction of photoirradiation (a direction of photo-alignment treatment) to the upper substrate.

In the liquid crystal display device of the present embodiment, the alignment direction of liquid crystal molecules may be divided into four or more directions, In such a case, it is possible to obtain a wide viewing angle display.

The present invention is further described in detail based on the following Examples with reference to the drawings. The present invention is not limited to those Examples.

In each Example, application by inkjet printing was carried out with respect to the ink having the best liquid spreading and liquid shrinkage properties in the Embodiment. The applied ink was formed into a liquid crystal panel so that its display quality is checked.

EXAMPLE 1

The ink was used whose solvent system was NMP/DEDG/DIBK=30/50/20. In addition, the ink was set to have a solid content of 2.8% by weight, a surface tension of 31 mN/m at 24° C., a viscosity of 4 mPa·s at 24° C., and to show the liquid spreading of 15 mm in a liquid spreading test and the liquid shrinkage of 100 nm in a liquid shrinkage test. In inkjet printing equipment used here, the nozzle pitch of heads was 0.75 mm, the number of nozzles was 64, and its stage velocity was set to 400 mm/sec. A substrate used here was a TFT substrate and a CF substrate, each of which had the contact angle with water of 0° to 3° and was preliminary washed by a normal cleaning method.

After carrying out inkjet printing to the TFT substrate and the CF substrate, prebaking at 80° C. for a minute and post baking at 200° C. for 40 minutes were sequentially carried out with a hot plate. Next, after a sealing material was applied to a predetermined position on the CF substrate with use of a dispenser, a liquid crystal material was dropped. Next, after the TFT and CF substrates were bonded together by being piled up in the same chamber under reduced pressure, the pressure of the chamber was returned to the atmospheric pressure. Then, the substrates were baked in an oven at 130° C. for one hour. Then, a liquid crystal display panel of this example was obtained through a normal module assembly process.

EXAMPLE 2

A liquid crystal display panel of the Example 2 was produced in the same manner as in Example 1 except that the ink used here had, a solvent system of BL/NMP/DEDG/DIBK/DPE=20/30/39/10/1. In addition, the ink was set to have a solid content of 2.8% by weight, a surface tension of 29 mN/mn at 24° C., a viscosity of 4 mPa·s at 24° C., and to show a liquid spreading of 22 mm in a liquid spreading test and the liquid shrinkage of 100 nm in a liquid shrinkage test.

EXAMPLE 3

A liquid crystal display panel of the Example 3 was produced in the same manner as in the Example 1 except that the ink used here had a solvent system of BL/NMP/DEDG/DIBK=20/30/40/10. In addition, the ink was set to have a solid content of 2.8% by weight, a surface tension of 31 mN/m at 24° C., a viscosity of 5 mPa·s at 24° C., and to show a liquid spreading of 14 mm in a spread test and the liquid shrinkage of 100 nm in a liquid shrinkage test.

COMPARATIVE EXAMPLE 1

A liquid crystal display panel of the Comparative Example 1 was produced in the same manner as in the Example 1 except that the ink used here had a solvent system of NMP/BC=50/50. In addition, the ink was set to have a solid content of 2.8% by weight, a surface tension of 33 mN/m at 24° C., and a viscosity of 5 mPa·s at 24° C.

COMPARATIVE EXAMPLE 2

A liquid crystal display panel of the Comparative Example 2 was produced in the same manner as in the Example 1 except that the ink used here had a solvent system of BL/NMP/BC=20/30/50. In addition, the ink was set to have a solid content of 2.8% by weight, a surface tension of 33 mN/m at 24° C., and a viscosity was 5 mPa·s at 24° C.

Table 4 shows the results of comparison among inks of the Examples 1 to 3 and the Comparative e Examples 1 and 2 with respect to their coating properties in inkjet printing and display qualities. In addition, the display quality was checked with respect to each of the liquid crystal display panels of Examples and Comparative examples in the state where the panel was entirely lit.

TABLE 4

|  | Medium | Solid content | Coating properties | | Display quality |
|---|---|---|---|---|---|
|  |  |  | TFT substrate | CF substrate |  |
| Example 1 | NMP/DEDG/DIBK = 30/50/20 | 2.8 wt % | Good | Good | Uniform display |
| Example 2 | BL/NMP/DEDG/DIBK/DPE = 20/30/39/10/1 | 2.8 wt % | Good | Good | Uniform display |
| Example 3 | BL/NMP/DEDG/DIBK = 20/30/40/10 | 2.8 wt % | Good | Good | Uniform display |
| Comparative Example 1 | NMP/BC = 50/50 | 2.8 wt % | Ink repelled | Ink repelled | Uneven display |
| Comparative Example 2 | BL/NMP/BC = 20/30/50 | 2.8 wt % | Ink repelled | Ink repelled | Uneven display |

As a result, each of the ink used in Examples 1 to 3 exerted good coating properties in inkjet printing and was uniformly applied to the TFT substrate and CF substrate. In contrast, each of the ink used in Comparative Examples 1 and 2 was remarkably repelled by the TFT substrate and CF substrate and was not able to be applied uniformly.

Further, the liquid crystal display panels of Examples 1 to 3 were able to display uniformly (white display). In contrast, on the liquid crystal display panels of Comparative Examples 1 and 2, display unevenness was observed.

The present application claims priority to Patent Application No. 2008-48307 filed in Japan on Feb. 28, 2008 under the Paris Convention and provisions of national law in a designated State, the entire contents of which are hereby incorporated by reference.

BRIEF DESCRIPTION OF DRAWINGS

FIG. 1 shows a schematic cross-sectional view for explaining the mechanism of liquid spreading of ink.

FIG. 2 are conceptual views each illustrating a state of polymer for forming a liquid crystal alignment film in a solvent. FIG. 2(a)illustrates the state in a low-concentration case and FIG. 2(b) illustrates the state in a high-concentration case.

FIGS. 3(a)to 3(c) are schematic cross-sectional views each illustrating an action of an ink drop having reached on a substrate.

FIG. 4 shows a basic structure of a polymer included in an alignment film material in accordance with a present Embodiment.

FIG. 5 shows another basic structure of the polymer included in the alignment film material in accordance with the present Embodiment.

FIG. 6 is a schematic perspective view showing the dropping process of ink in a liquid spreading test.

FIG. 7 shows comparison results of evaluations on liquid spreading and liquid shrinkage with respect to inks containing: a mixed solvent of BL/NMP=20/30 as a good solvent and BC as a poor solvent; a mixed solvent of BL/NMP=20/30 as a good solvent and DEDG as a poor solvent; a mixed solvent of BL/NMP=20/30 as a good solvent and a mixed solvent of BC/a poor solvent other than BC and DEDG (PA, HA, or DIBK)=40/10 as a poor solvent; or a mixed solvent of BL/NMP=20/30 as a good solvent and a mixed solvent of DEDG/a poor solvent other than BC and DEDG (PA, HA, or DIBK)=40/10 as a poor solvent.

FIG. 8 shows comparison results of evaluations on the dependence of liquid spreading and liquid shrinkage of ink on BL ratio.

FIG. 9 shows the results of evaluation and comparison of the dependence on addition of 1% by weight of DPE of liquid spreading and liquid shrinkage of ink.

FIG. 10 shows the results of evaluation and comparison of the dependence of liquid shrinkage and liquid spreading on the solid component concentration of ink.

FIG. 11 shows the result of the study on viscosity adjustment of ink.

FIG. 12 is a perspective view schematically showing a relationship between a photo-alignment treatment direction and a pretilt direction of a liquid crystal molecule in accordance with Embodiment 1.

FIG. 13(a)is a plan view schematically showing a director alignment of liquid crystal in one pixel (one sub-pixel); and directions of photo-alignment treatment for a pair of substrates (upper and lower substrates) in the case that the liquid crystal display device in Embodiment 1 is a mono-domain device. FIG. 13(b) is a schematic view showing directions of absorption axes of polarization plates arranged in the liquid crystal display device shown in FIG. 13(a).

FIG. 14(a)is a plan view schematically showing a director alignment of liquid crystal in one pixel(one sub-pixel); and directions of photo-alignment treatment for a pair of substrates (upper and lower substrates) in the case that the liquid crystal display device in Embodiment 1 is a mono-domain device. FIG. 14(b) is a schematic view showing directions of absorption axes of polarization plates arranged in the liquid crystal display device shown in FIG. 14(a).

EXPLANATION OF NUMERALS AND SYMBOLS

Figure 1:
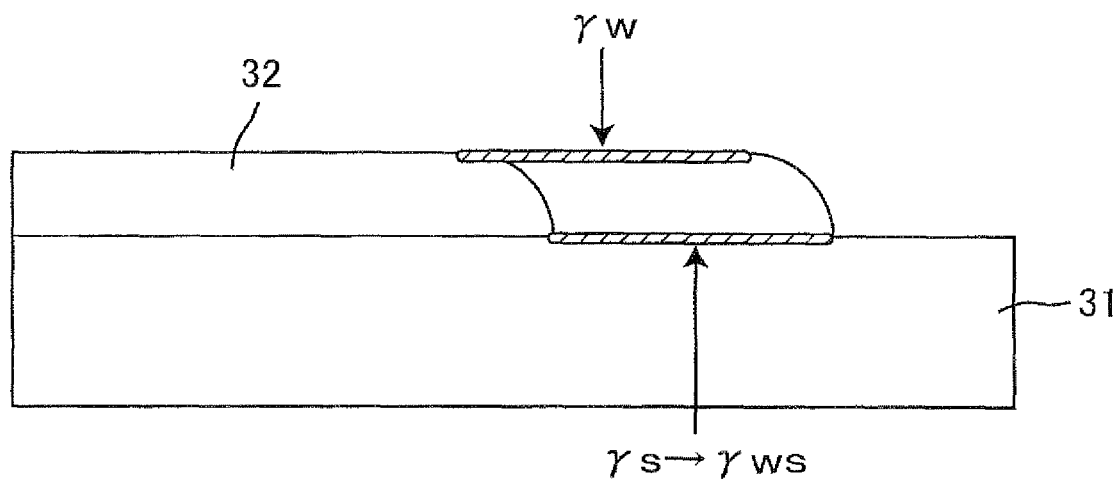
[FIG. 1]
Figure 2:
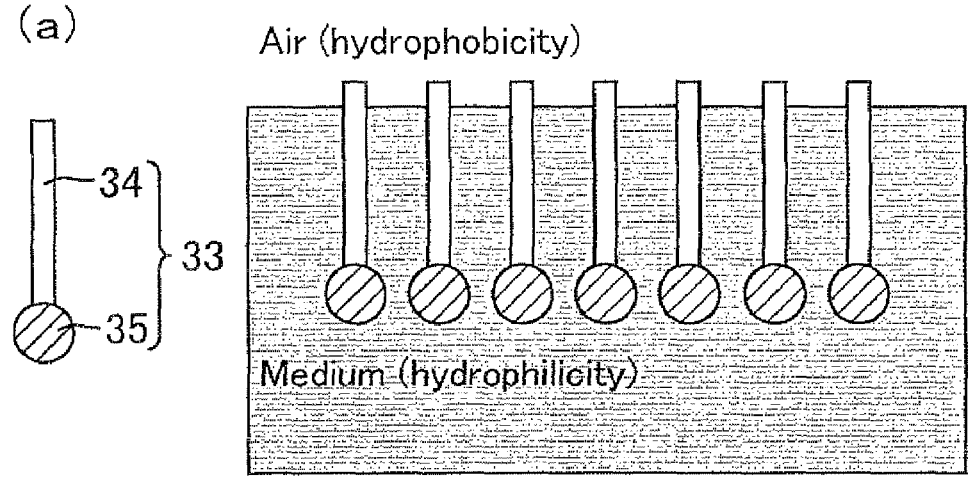
[FIG. 2]
Figure 2:
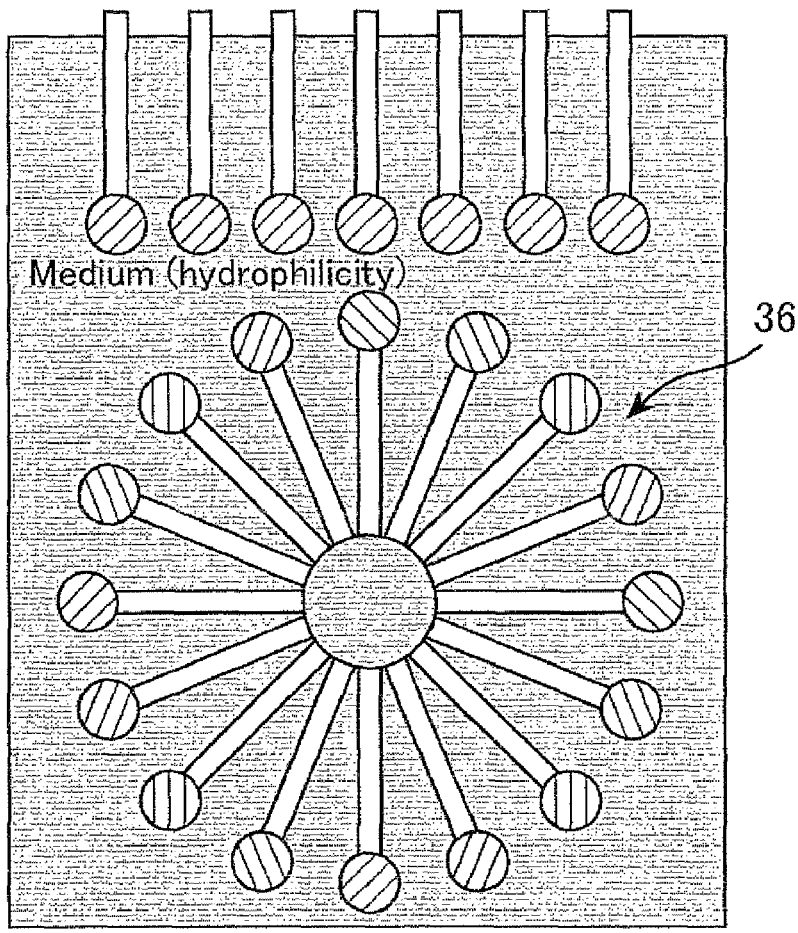
Figure 3:
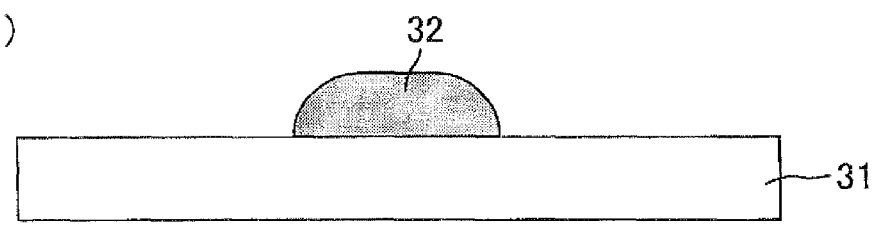
[FIG. 3]
Figure 4:
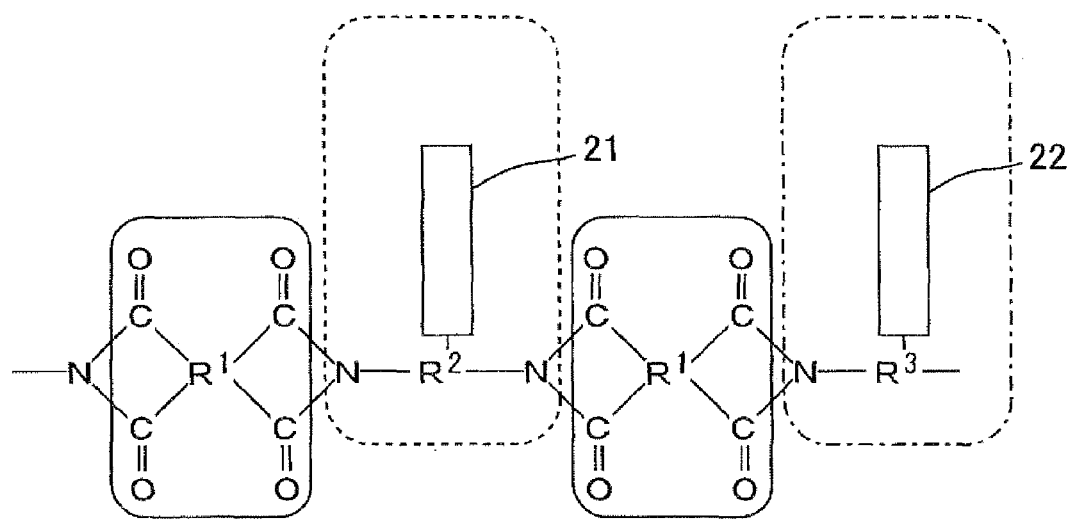
[FIG. 4]
Figure 5:
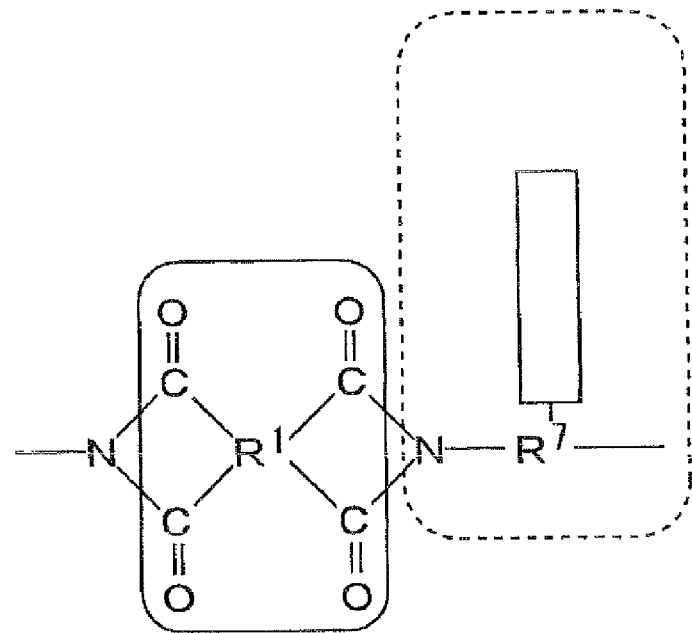
[FIG. 5]
Figure 6:
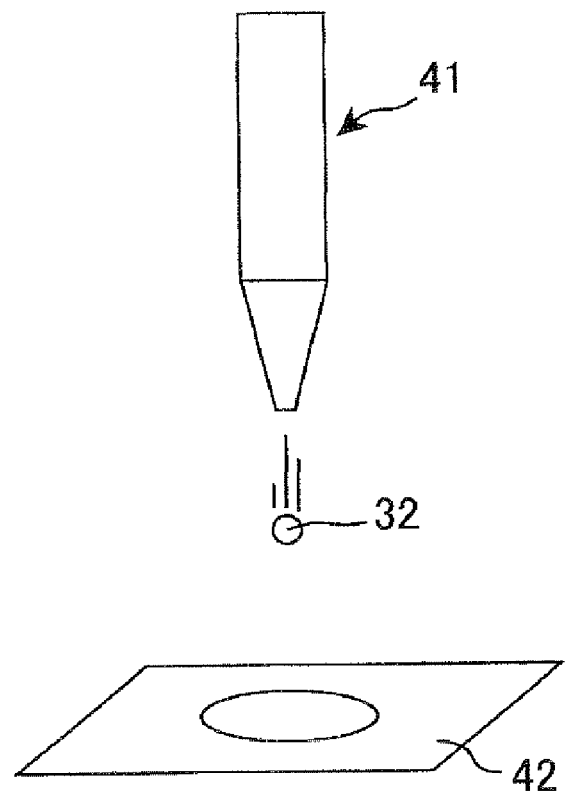
[FIG. 6]
Figure 7:
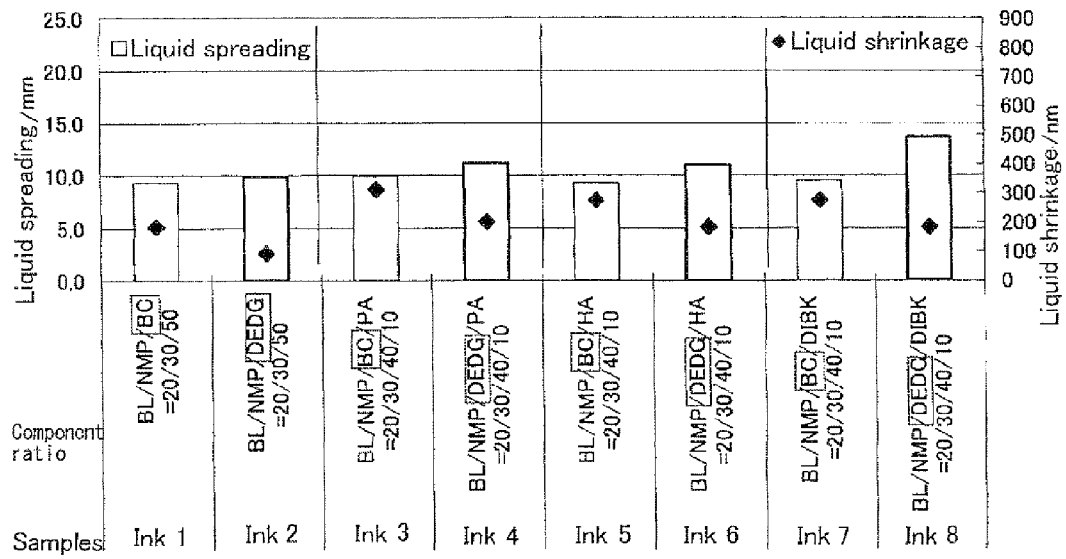
[FIG. 7]
Figure 8:
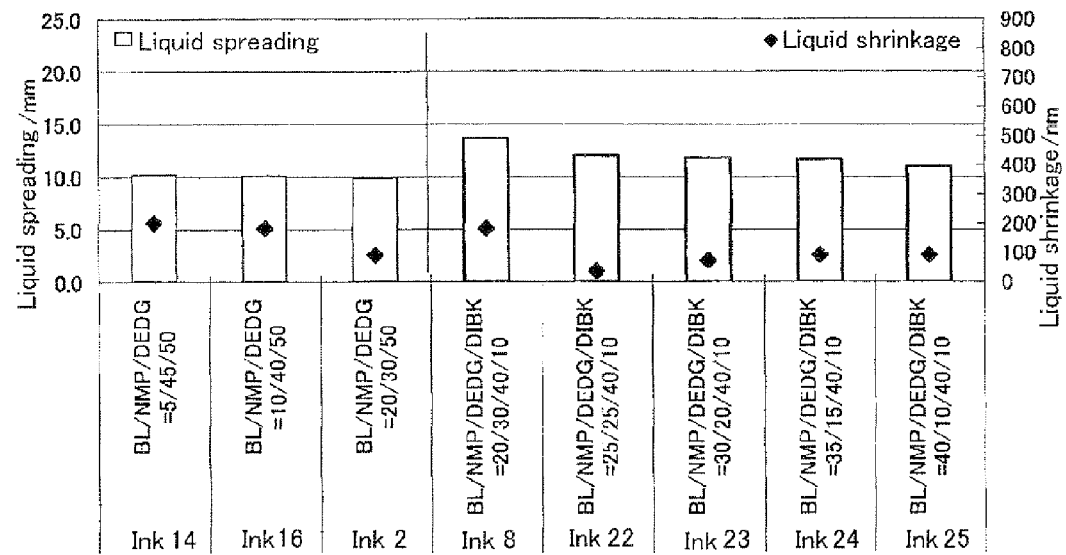
[FIG. 8]
Figure 9:
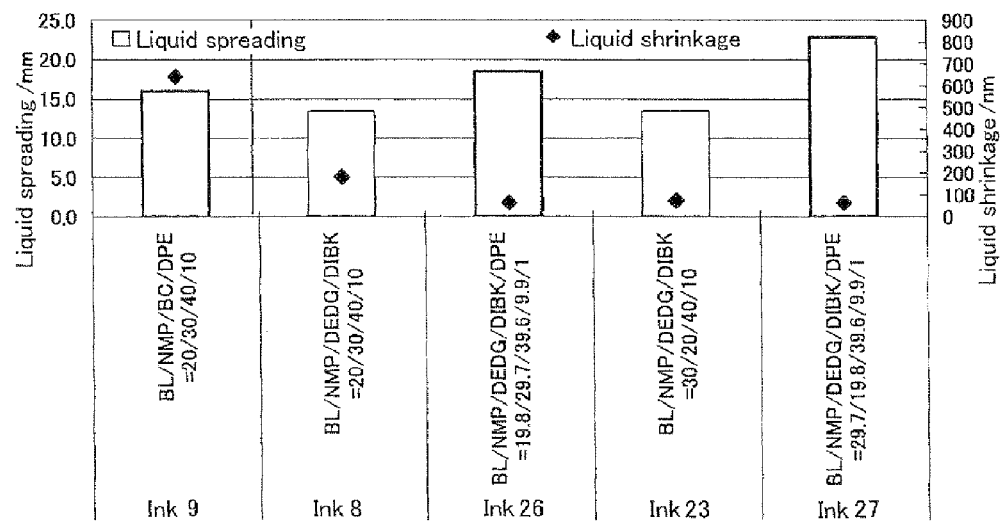
[FIG. 9]
Figure 10:
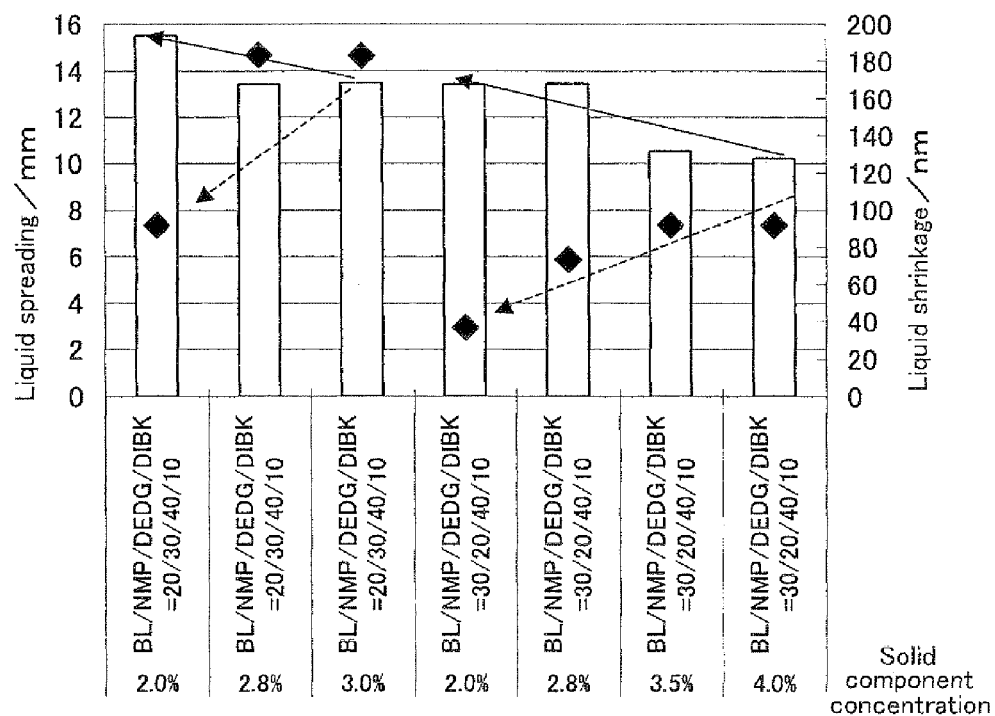
[FIG. 10]
Figure 11:
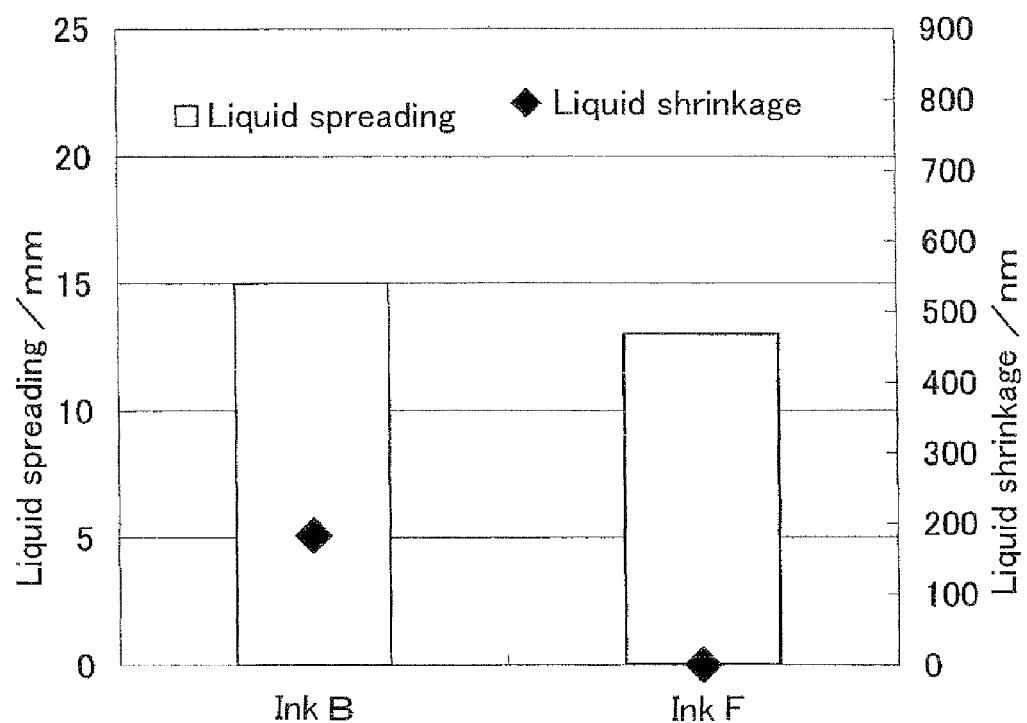
[FIG. 11]
Figure 12:
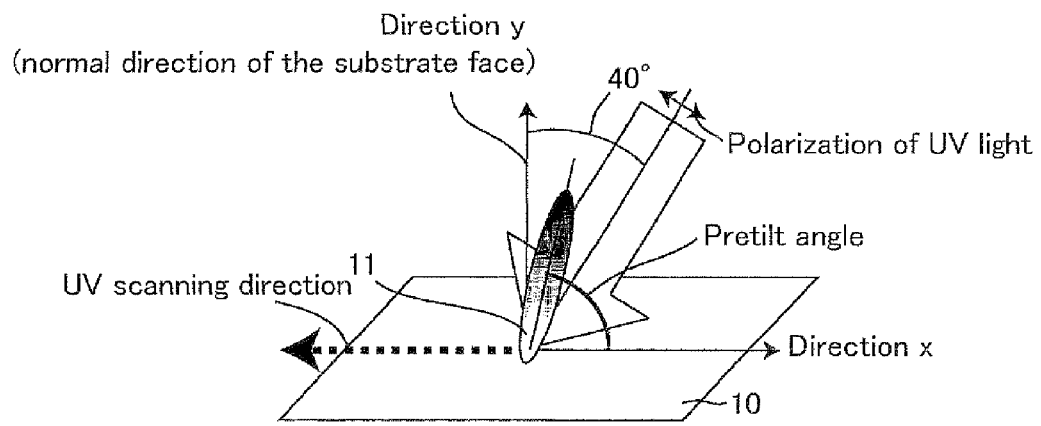
[FIG. 12]
Figure 13:
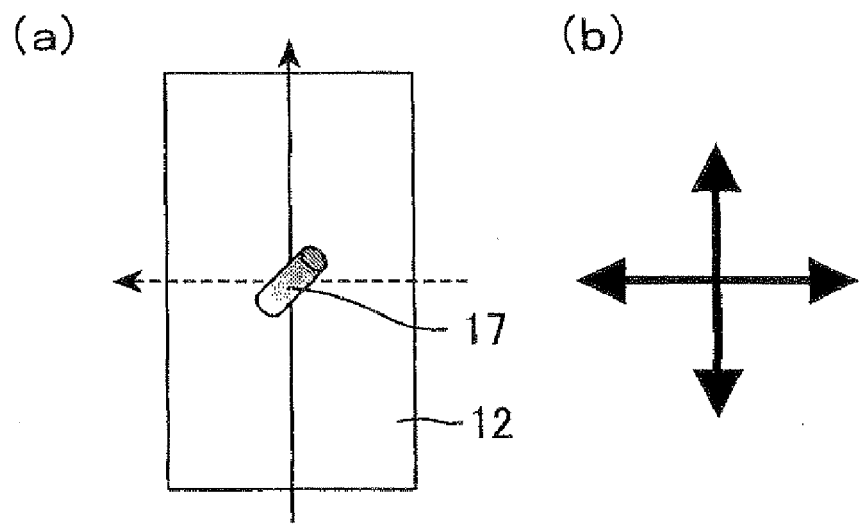
[FIG. 13]
Figure 14:
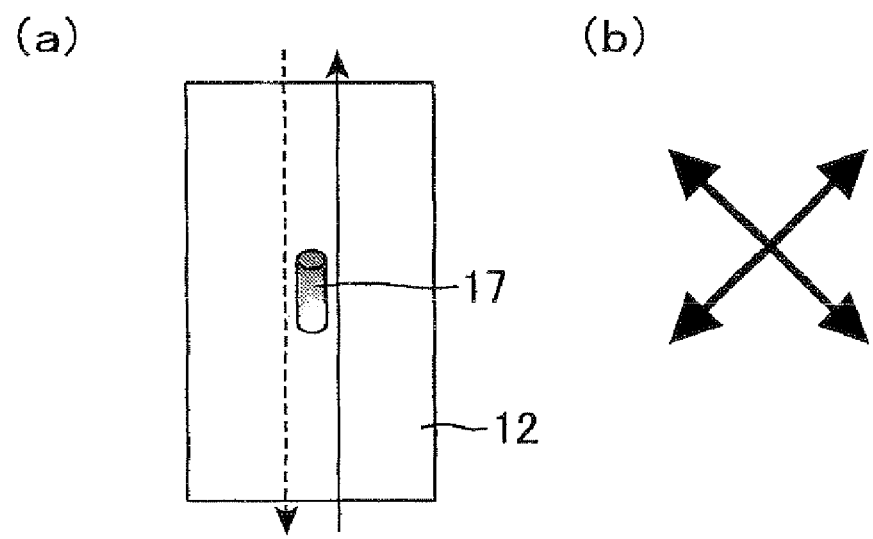
[FIG. 14]

10: Alignment Film
11: Liquid Crystal molecule
12: Upper and Lower substrates
17: Average liquid crystal director alignment under AC voltage application
21: Side chain including a photo functional group
22: Side chain including a vertical alignment functional group
31: Solid matrix (substrate)
32: Liquid (ink, alignment agent)
33: Amphiphile (solid component of polymer of liquid crystal alignment Film)
34: Hydrophobic part
35: Hydrophilic part
36: Micell
41: Electronic Control Micro Pipette
42: Substrate for dropping ink thereon

The invention claimed is:

1. A composition for forming a liquid crystal alignment film, wherein the composition comprises:
    a material for forming a liquid crystal alignment film;
    diethylene glycol diethyl ether;
    diisobutyl ketone; and
    at least one of y-butyrolactone and N-methyl-2-pyrrolidone.

2. The composition for forming a liquid crystal alignment film according to claim 1,
    wherein the composition comprises at least one of the y-butyrolactone and the N-methyl-2-pyrrolidone as a good solvent for the material for forming a liquid crystal alignment film.

3. The composition for forming a liquid crystal alignment film according to claim 1
    wherein the composition comprises the diethylene glycol diethyl ether and the diisobutyl ketone as poor solvents for the material for forming a liquid crystal alignment film.

4. The composition for forming a liquid crystal alignment film according to claim 1,
    wherein the material comprises a copolymer formed by polymerizing two diamines with an acid anhydride.

5. The composition for forming a liquid crystal alignment film according to claim 4,
    wherein the two diamines includes:
    diamine having a side chain including a photofunctional group and fluorine; and
    diamine having a side chain including a vertical alignment functional group.

6. The composition for forming a liquid crystal alignment film according to claim 4,
    wherein the material for forming a liquid crystal alignment film is a polyamic acid or a polyimide which comprises:
    an acid anhydride unit derived from an acid anhydride; a photo-alignment
    diamine unit derived from a diamine having a side chain including a photofunctional group and fluorine; and
    a vertical alignment diamine unit derived from a diamine having a side chain including a vertical alignment functional group, and has the acid anhydride unit and any of the photo-alignment diamine unit and the vertical alignment diamine unit alternately arranged in the polyamic acid or the polyimide.

7. The composition for forming a liquid crystal alignment film according to claim 1,
   wherein the composition for forming a liquid crystal alignment film has a solid content of 2% to 5% by weight.

8. The composition for forming a liquid crystal alignment film according to claim 1,
   wherein the composition for forming a liquid crystal alignment film has a surface tension of 28 to 32 mN/in at 24° C.

9. The composition for forming a liquid crystal alignment film according to claim 1,
   wherein the composition for forming a liquid crystal alignment film has a viscosity of 5 to 10 mPa·s at 24° C.

10. The composition for forming a liquid crystal alignment film according to claim 1,
    wherein the composition for forming a liquid crystal alignment film has the boiling point of 160 to 220° C. at atmospheric pressure.

11. The composition for forming a liquid crystal alignment film according to claim 1,
    wherein the composition for forming a liquid crystal alignment film spreads not less than 13 mm in a liquid spreading test and shrinks 100 nm or less in a liquid shrinkage test.

12. The composition for forming a liquid crystal alignment film according to claim 1,
    wherein the composition for forming a liquid crystal alignment film starts exhibiting a property of controlling alignment of liquid crystal molecules by photoirradiation.

13. The composition for forming a liquid crystal alignment film according to claim 1,
    wherein the composition for forming a liquid crystal alignment film further comprises dipentyl ether.

14. The composition for forming a liquid crystal alignment film according to claim 1,
    wherein the composition for forming a liquid crystal alignment film is discharged to a substrate for liquid crystal display device by inkjet printing.

15. A liquid crystal display device comprising
    a liquid crystal alignment film formed from the composition for forming a liquid crystal alignment film according to claim 1 and provided with an alignment treatment by photoirradiation.

16. The liquid crystal display device according to claim 15,
    wherein the thickness of the liquid crystal alignment film after pre-baking is 40 to 150 nm.

17. The liquid crystal display device according to claim 15,
    wherein the composition for forming a liquid crystal alignment film comprises a copolymer including as essential constitutional units:
    a first constitutional unit starting exhibiting a property of controlling alignment of liquid crystal molecules by photoirradiation; and
    a second constitutional unit exhibiting the property of controlling alignment of liquid crystal molecules regardless of the photoirradiation, and
    the liquid crystal alignment film is a film formed from the composition for forming a liquid crystal alignment film and provided with an alignment treatment by photoirradiation.

* * * * *